United States Patent
Zhang et al.

(10) Patent No.: US 11,991,541 B2
(45) Date of Patent: May 21, 2024

(54) LINK FAILURE RECOVERY METHOD AND APPARATUS

(71) Applicant: HUAWEI TECHNOLOGIES CO., LTD., Shenzhen (CN)

(72) Inventors: Di Zhang, Shenzhen (CN); Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 286 days.

(21) Appl. No.: 17/477,973

(22) Filed: Sep. 17, 2021

(65) Prior Publication Data
US 2022/0007215 A1    Jan. 6, 2022

Related U.S. Application Data

(63) Continuation of application No. PCT/CN2020/079227, filed on Mar. 13, 2020.

(30) Foreign Application Priority Data

Mar. 20, 2019  (CN) .......................... 201910212397.3

(51) Int. Cl.
*H04W 24/04* (2009.01)
*H04L 5/00* (2006.01)
*H04W 76/11* (2018.01)
*H04W 76/18* (2018.01)

(52) U.S. Cl.
CPC ........... *H04W 24/04* (2013.01); *H04L 5/0048* (2013.01); *H04W 76/11* (2018.02); *H04W 76/18* (2018.02)

(58) Field of Classification Search
CPC ..... H04W 24/04; H04W 76/11; H04W 76/18; H04W 76/19; H04L 5/0048; H04L 5/0091; H04L 5/0053
(Continued)

(56) References Cited

U.S. PATENT DOCUMENTS 10,863,570 B2 * 12/2020 Cirik .................... H04W 76/19
2015/0245407 A1    8/2015 Johansson et al.
(Continued)

FOREIGN PATENT DOCUMENTS

CN    105103593 A    11/2015
CN    108377577 A    8/2018
(Continued)

OTHER PUBLICATIONS

Qualcomm Incorporated, Enhancement of Multi-beam Operation, 3GPP draft, (Year: 2019).*
(Continued)

*Primary Examiner* — Kwang B Yao
*Assistant Examiner* — Syed M Bokhari
(74) *Attorney, Agent, or Firm* — Rimon PC

(57) ABSTRACT

This application provides a link failure recovery method and apparatus. A terminal is configured to send first request information to a network device on the same resource (namely, a first resource) when detecting that a link of any one of a plurality of cells fails or the links of more than one of the plurality of cells fail, to notify the network device that a link of at least one of the cells fails. In this way, in a multi-carrier scenario resource overheads are reduced as compared to the solution of using separate resources to notify link failures in multiple cells.

16 Claims, 11 Drawing Sheets

(58) Field of Classification Search
USPC .......................................................... 370/216
See application file for complete search history.

(56) References Cited

U.S. PATENT DOCUMENTS

| | | | | |
|---|---|---|---|---|
| 2019/0190582 A1* | 6/2019 | Guo | ...................... | H04L 1/0061 |
| 2020/0178338 A1* | 6/2020 | Ahn | ...................... | H04W 24/10 |
| 2020/0260300 A1* | 8/2020 | Cirik | ................... | H04W 72/046 |

FOREIGN PATENT DOCUMENTS

| | | | |
|---|---|---|---|
| CN | 109309968 | A | 2/2019 |
| EP | 3836693 | A1 | 6/2021 |
| IN | 110831189 | A | 2/2020 |
| WO | 2015136122 | A1 | 9/2015 |
| WO | 2018148552 | A1 | 8/2018 |
| WO | 2018156601 | A1 | 8/2018 |
| WO | 2018190617 | A1 | 10/2018 |
| WO | 2020034877 | A1 | 2/2020 |

OTHER PUBLICATIONS

CMCC, Enhancements on multi-beam operation. 3GPPTSG RAN WG1#96, Athens, Greece, Feb. 25-Mar. 1, 2019, R1-1902339, 6 pages.

Intel Corporation, On Beam Management Enhancement. 3GPP TSG RAN WG1 Meeting##96, Athens, Greece, Feb. 25-Mar. 1, 2019, R1-1902503, 14 pages.

NTT Docomo, Inc., Discussion on multi-beam enhancement. 3GPP TSG RAN WG1 #96, Athens, Greece, Feb. 25-Mar. 1, 2019, R1-1902813, 22 pages.

Qualcomm Incorporated, Enhancements on Multi-beam Operation. 3GPP TSG-RAN WG1 Meeting#96, Athens, Greece, Feb. 25-Mar. 1, 2019, R1-1903044, 20 pages.

Huawei, HiSilicon, Beam failure recovery for Scell. 3GPP TSG RAN WG1 Meeting #96, Athens, Greece, Feb. 25-Mar. 1, 2019, R1-1903093, 8 pages.

Huawei, HiSilicon, Enhancements on multi-beam operation. 3GPP TSG RAN WG1 Meeting #99, Reno, USA, Nov. 18-22, 2019, R1-1911903, 8 pages.

Asia Pacific Telecom co. Ltd, Remaining issues on SCell BFR procedure. 3GPP TSG-RAN WG2 Meeting #109 electronic, Elbonia, Feb. 24-Mar. 6, 2020, R2-2001421, 4 pages.

Huawei, HiSilicon, Beam failure recovery for Scell. 3GPP TSG RAN WG1 Meeting #95, Spokane, USA, Nov. 12 16, 2018, R1-1813561, 7 pages.

Convida Wireless, On Beam Failure Recovery for Scell. 3GPP TSG-RAN WG1 Meeting #95, Spokane, USA, Nov. 12 16, 2018, R1-1813624 , 4 pages.

* cited by examiner

LINK FAILURE RECOVERY METHOD AND APPARATUS

CROSS-REFERENCE TO RELATED APPLICATIONS

This application is a continuation of International Application No. PCT/CN2020/079227, filed on Mar. 13, 2020, which claims priority to Chinese Patent Application No. 201910212397.3, filed on Mar. 20, 2019. The disclosures of the aforementioned applications are hereby incorporated by reference in their entireties.

TECHNICAL FIELD

This application relates to the communication field, and more specifically, to a link failure recovery method and apparatus.

BACKGROUND

Because a communication process may be blocked and the diffraction capability of a high frequency channel may be poor, if a current serving beam is blocked, the signal transmission cannot proceed. To prevent communication interruption caused by beam blocking, a mechanism needs to be introduced to detect beam quality and quickly recover a link when the beam is blocked.

When detecting a link fault, a terminal sends request information to a network device twice. For example, a first piece of request information is used to notify the network device of the link failure, and a second piece of request information is used to indicate information about a new identified beam. The first piece of request information may be periodically sent, and the second piece of request information may be sent aperiodically. In this way, compared to the resource overheads in a solution in which both the request information used to indicate the link failure and the request information about the new identified beam are sent periodically and frequently, resource overheads can be reduced. The first piece of request information may be a beam failure recovery request (beam failure recovery request, BFRQ) 1, BFRQ 1, and the second piece of request information may be a BFRQ 2.

However, in a multi-carrier scenario, each component carrier (CC) corresponds to one cell. When the terminal detects a link fault, if the terminal sends the request information in the foregoing manner, resource overheads are still relatively large.

SUMMARY

This application provides a link failure recovery method and apparatus, to reduce resource overheads.

According to a first aspect, a link failure recovery method is provided. The method includes: sending first request information on a first resource, where the first request information is used to indicate that a link of at least one of L cells fails, and L is an integer greater than 1; and sending second request information on a second resource, where the second request information is used to indicate cell information of M cells whose links fail and that are in the L cells, $M \geq 1$, and M is an integer.

A terminal may send the first request information to a network device on a same resource (namely, the first resource) when detecting that a link of any one of the L cells fails or links of any more than one of the L cells fail, to notify the network device that the link of at least one of the L cells fails. In this way, in a multi-carrier scenario, compared with resource overheads in a solution in which when a link of each cell fails, one resource is occupied to send one piece of request information, resource overheads are reduced in the embodiments of this application. The second request information is used to indicate cell identities of the M cells whose links fail and that are in the L cells. In this way, the network device can learn, based on the second request information, of related information of a specific cell whose link fails and that is in the L cells. When M=1, the second request information may be used to indicate cell information of any one of the L cells whose link fails. In this way, compared with resource overheads in a solution in which different resources are occupied by request information of each cell to send the second request information, resource overheads are reduced. When $M \geq 1$, the second request information may be used to indicate cell information of a plurality of cells whose links fail. In this way, compared with a recovery delay in a solution in which request information of each of the M cells is separately sent or asynchronously sent, a recovery delay is reduced in the embodiments of this application.

In some possible implementations, the cell information of the M cells includes cell identities of the M cells and/or N pieces of first reference signal information used to recover the M cells, $N \geq 1$, and N is an integer.

There may be a mapping relationship between a cell identity and first reference signal information. In this way, when the cell information of the M cells includes only the cell identities of the M cells, the network device can determine a corresponding first reference signal based on the identities of the M cells. Alternatively, when the cell information of the M cells includes only N first reference signals, the network device can determine a corresponding cell identity based on the N first reference signals. In this way, content carried in the second request information is reduced, and resource occupation is reduced.

In some possible implementations, the method further includes: detecting response information of the M cells; and sending third request information, where when no response information of an $i^{th}$ cell in the M cells is detected, the third request information indicates a cell identity of the $i^{th}$ cell and/or second reference signal information used to recover the $i^{th}$ cell, i is a positive integer, and $1 \leq i \leq M$; and when response information of a $j^{th}$ cell in the M cells is detected, the third request information further indicates confirm information of the $j^{th}$ cell, j is a positive integer, $1 \leq j \leq M$, and i is not equal to j.

When the terminal detects the response information of the second request information corresponding to the $j^{th}$ cell, the terminal sends, to the network device, the third request information including the confirm information of the $j^{th}$ cell. In this way, the network device can learn that a link of the $j^{th}$ cell is successfully recovered, so that the second resource can be deactivated, and a resource waste is avoided. Alternatively, the second resource (which may be configured to transmit other information, or be deactivated to others for transmitting uplink data or an uplink signal) can be deactivated in time when a link of the network device or all links of the M cells are successfully recovered.

In some possible implementations, the third request information is sent, where when no response information of the $i^{th}$ cell in the M cells is detected, the third request information indicates the cell identity of the $i^{th}$ cell and/or the second reference signal information used to recover the $i^{th}$ cell, i is a positive integer, and $1 \leq i \leq M$; or when the response information of the $j^{th}$ cell in the M cells is detected, the third request information is used to indicate the confirm information of the $j^{th}$ cell, j is a positive integer, 1≤j≤M, and i=j.

If the terminal device detects no response information of the second request information, the terminal may resend cell information of the $i^{th}$ cell, thereby improving a probability of successful link recovery, and improving signal transmission efficiency.

In some possible implementations, cell information of a $k^{th}$ cell in the M cells includes q pieces of first reference signal information, k is a positive integer, and 1<q≤N.

The cell information of the $k^{th}$ cell in the M cells may include a plurality of first reference signals. In other words, the terminal may simultaneously send a plurality of pieces of reference signal information to jointly recover the $k^{th}$ cell whose link fails, thereby further improving the probability of successful link recovery.

In some possible implementations, the detecting response information of the M cells includes: detecting, based on the q pieces of reference signal information, response information corresponding to the $k^{th}$ cell. The terminal device may detect the response information based on the q reference signals in a beam sweeping manner, or the terminal device may detect the response information based on one or more of the q reference signals simultaneously (in this case, the terminal device may have a plurality of panels).

In some possible implementations, the detecting response information of the M cells includes: detecting, based on a priority sequence of the q pieces of reference signal information, response information corresponding to the $k^{th}$ cell.

Priorities of the q pieces of reference signal information may be determined by the terminal based on success rates of recovering a link of the $k^{th}$ cell or quality of reference signals, may be determined based on a sequence of IDs of the reference signal information, or may be determined based on a sequence of reporting the reference signal information. The terminal may separately detect, based on the priority sequence of the q pieces of reference signal information, the response information corresponding to the $k^{th}$ cell. In this way, a probability of successful transmission of response information of the second request information, namely, a probability of successful link failure recovery, can be improved.

It should be understood that, in this embodiment, priorities of reference signal information may be equivalent to a sequence of success rates of recovering the link of the $k^{th}$ cell or a sequence of quality values of reference signals, or may be a sequence of IDs of the reference signal information or a sequence of reporting the reference signal information. There may be other description manners in this application. This is not limited.

In some possible implementations, the detecting, based on a priority sequence of the reference signal information, response information corresponding to the $k^{th}$ cell includes: detecting, in a $p^{th}$ time window based on reference signal information whose priority ranks $p^{th}$ and that is in the q pieces of reference signal information, the response information corresponding to the $k^{th}$ cell, where 1≤p≤q.

The terminal may detect, based on each of the q pieces of reference signal information, the response information corresponding to the $k^{th}$ cell in a corresponding time window. In this way, excessively long waiting duration for detecting the response information of the second request information based on a reference signal is avoided, and a relatively long link recovery delay caused by the excessively long waiting duration is avoided. That is, in the embodiments of this application, link recovery efficiency is improved, and a time length of link recovery is reduced.

In some possible implementations, the method further includes: sending fifth request information after no response information corresponding to the $k^{th}$ cell is detected in the $p^{th}$ time window based on the priority ranking $p^{th}$, where the fifth request information is used to indicate that no response information corresponding to the $k^{th}$ cell is detected in the $p^{th}$ time window.

If no response information of the second request information is detected, the fifth request information may be further sent to the network device. The fifth request information is used to indicate that no response information of the second request information corresponding to a $p^{th}$ reference signal is detected. The network device may learn, based on the fifth request information, of whether the terminal receives the response information, and learn that the terminal further continues to send request information. In this way, the network device can prepare for link recovery in advance, thereby further reducing a delay.

In some possible implementations, the method further includes: after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

That the terminal detects the response information of the second request information based on the priority sequence of the q pieces of reference signal information may be that when the response information of the second request information fails to be detected based on a previous piece of reference signal information (for example, a $p^{th}$ piece of reference signal information), the response information of the second request information is detected based on a next piece of reference signal information (for example, a $(p+1)^{th}$ piece of reference signal information), to further reduce signaling overheads.

In some possible implementations, the fifth request information is carried on the second resource.

The fifth request information may be carried on the second resource. That is, the fifth request information occupies a same resource as the second request information. That is, the fifth request information may use a semi-static resource, thereby reducing resource overheads.

In some possible implementations, the sending third request information includes: sending the third request information on the second resource.

The terminal may reuse a resource for sending the second request information to send the third request information, and does not need to wait for response information of the first request information to reallocate a resource to send the third request information, thereby reducing a time length of resource allocation, and improving an overall link recovery speed.

In some possible implementations, the method further includes: deactivating the second resource when the response information of the M cells is detected.

When all the M cells are successfully recovered, the terminal may deactivate the second resource. For example, when detecting response information of the second request information corresponding to each of the M cells, the terminal may determine that all the M cells are successfully recovered. Alternatively, when detecting response information of the second request information corresponding to some cells in the M cells and response information of the third request information corresponding to the other cells in the M cells, the terminal determines that all the M cells are successfully recovered. Alternatively, when detecting the response information of the third request information of each of the M cells, the terminal determines that all the M cells are successfully recovered.

In some possible implementations, when no response information of at least one of the M cells is detected, the method further includes: resending the first request information on a fourth resource; and receiving response information of the resent first request information, where the response information of the resent first request information is used to indicate a third resource; and the sending third request information includes: sending the third request information on the third resource.

The third resource may be dynamically configured, thereby improving resource utilization.

In some possible implementations, the fourth resource is the same as the first resource.

For the first request information, a resource for transmitting the first request information may be static. That is, a resource occupied for initial transmission of the first request information may also be used to retransmit the first request information. No reallocation is needed, thereby saving time.

In some possible implementations, W≤X·L, W is a maximum value of a quantity of transmissions of the first request information, and X is a maximum value of a quantity of transmissions of request information used to indicate cell information of any one of the M cells.

Whether M is equal to 1 or is greater than 1 may depend on a size of the second resource configured by a base station or a status of a resource cell whose link fails. In this way, in the embodiments of this application, the terminal device can avoid frequently sending link failure recovery request information, thereby reducing power consumption overheads.

In some possible implementations, the method further includes: receiving response information of the first request information, where the response information of the first request information is used to indicate or activate the second resource.

That the response information of the first request information is used to activate the second resource means that when the terminal device needs to retransmit information about a cell whose link fails, the terminal device may no longer need to send retransmission information by using a resource allocated by the response information of the first request information, but directly sends the retransmission information on the second resource. A recovery delay can be effectively reduced.

That the response information of the first request information is used to indicate the second resource means that when the terminal device needs to retransmit the information about the cell whose link fails, the terminal device may further send retransmission information by using a resource dynamically allocated by the response information of the first request information. Resource overheads can be effectively reduced.

In some possible implementations, the second resource is configured by using higher layer signaling, or the second resource is a resource associated with the first resource or the first request information.

The second resource may be configured by the network device for the terminal, and is sent to the terminal by using the higher layer signaling or system information. Alternatively, the second resource may be agreed on by the network device and the terminal device in advance, or may be set by the terminal in advance. This is not limited in this application. In this method, when the terminal device needs to retransmit information about a cell whose link fails, the terminal device may no longer need to send retransmission information by using a resource allocated by the response information of the first request information, but directly sends the retransmission information on the second resource. A link recovery delay can be effectively reduced, and a link recovery speed can be improved.

In some possible implementations, before the sending first request information on a first resource, the method further includes: determining that the link of at least one of the L cells fails; or determining that the link of at least one of the L cells fails and reference signal information used to recover the link of the at least one cell.

In the embodiments of this application, link recovery flexibility can be improved.

In some possible implementations, the method further includes: receiving configuration information, where the configuration information is used to indicate the first resource.

According to a second aspect, a link failure recovery method is provided. The method includes: receiving first request information on a first resource, where the first request information is used to indicate that a link of at least one of L cells fails, and L is an integer greater than 1; and receiving second request information on a second resource, where the second request information is used to indicate cell information of M cells whose links fail and that are in the L cells, M≥1, and M is an integer.

In a multi-carrier scenario, compared with resource overheads in a solution in which when a link of each cell fails, one resource is occupied to send one piece of request information, resource overheads are reduced in the embodiments of this application. The second request information is used to indicate cell identities of the M cells whose links fail and that are in the L cells. In this way, a network device can learn, based on the second request information, of related information of a specific cell whose link fails and that is in the L cells.

In some possible implementations, the cell information of the M cells includes cell identities of the M cells and/or N pieces of first reference signal information used to recover the M cells, N≥1, and N is an integer.

There may be a mapping relationship between a cell identity and first reference signal information. In this way, when the cell information of the M cells includes only the cell identities of the M cells, the network device can determine a corresponding first reference signal based on the identities of the M cells. Alternatively, when the cell information of the M cells includes only N first reference signals, the network device can determine a corresponding cell identity based on the N first reference signals. In this way, content carried in the second request information is reduced, and resource occupation is reduced.

In some possible implementations, the method further includes: sending response information of a $j^{th}$ cell in the M cells, and receiving third request information, where the third request information is used to indicate a cell identity of an $i^{th}$ cell in the M cells and/or second reference signal information used to recover the $i^{th}$ cell and confirm information of the $j^{th}$ cell, 1≤i≤M, 1≤j≤M, i is not equal to j, and both i and j are positive integers; receiving the third request information, where the third request information is used to indicate the cell identity of the $i^{th}$ cell and/or the second reference signal information used to recover the $i^{th}$ cell, i is a positive integer, and 1≤i≤M; or sending the response information of the $j^{th}$ cell, and receiving the third request information, where the third request information is used to indicate the confirm information of the $j^{th}$ cell, j is a positive integer, and 1≤j≤M.

In some possible implementations, cell information of a $k^{th}$ cell in the M cells includes q pieces of first reference signal information, k is a positive integer, and 1<q≤N.

The cell information of the $k^{th}$ cell in the M cells may include a plurality of first reference signals. In other words, the network device may simultaneously receive a plurality of pieces of reference signal information to jointly recover the $k^{th}$ cell whose link fails, thereby further improving a probability of successful link recovery.

In some possible implementations, the sending response information of the M cells includes: sending, based on the q pieces of reference signal information, response information corresponding to the $k^{th}$ cell. The network device may send the response information based on the q reference signals in a beam sweeping manner, or the network device may send the response information based on one or more of the q reference signals simultaneously (in this case, the network device may have a plurality of panels).

In some possible implementations, the sending response information of the M cells includes: sending, based on a priority sequence of the q pieces of reference signal information, response information corresponding to the $k^{th}$ cell.

Priorities of the q pieces of reference signal information may be determined by the network device based on success rates of recovering a link of the $k^{th}$ cell or quality of reference signals, may be determined based on a sequence of IDs of the reference signal information, or may be determined based on a sequence of reporting the reference signal information. The network device separately sends, based on the priority sequence of the q pieces of reference signal information, the response information corresponding to the $k^{th}$ cell. In this way, a probability of successful transmission of the response information of the second request information, namely, a probability of successful link failure recovery, can be improved.

It should be understood that, in this embodiment, priorities of reference signal information may be equivalent to a sequence of success rates of recovering the link of the $k^{th}$ cell or a sequence of quality values of reference signals, or may be a sequence of IDs of the reference signal information or a sequence of reporting the reference signal information. There may be other description manners in the present invention. This is not limited.

In some possible implementations, the sending, based on a priority sequence of the reference signal information, response information corresponding to the $k^{th}$ cell includes: sending, in a $p^{th}$ time window based on reference signal information whose priority ranks $p^{th}$ and that is in the q pieces of reference signal information, the response information corresponding to the $k^{th}$ cell, where 1≤p≤q.

The network device may send, based on each of the q pieces of reference signal information, the response information corresponding to the $k^{th}$ cell in a corresponding time window. In this way, excessively long waiting duration for sending the response information of the second request information based on a reference signal is avoided, and a relatively long link recovery delay caused by the excessively long waiting duration is avoided. That is, in the embodiments of this application, link recovery efficiency is improved, and a time length of link recovery is reduced.

In some possible implementations, the method further includes: receiving fifth request information, where the fifth request information is used to indicate that no response information corresponding to the $k^{th}$ cell is detected in the $p^{th}$ time window. The network device may learn, based on the fifth request information, of whether a terminal receives the response information, and learn that the terminal further continues to send request information. In this way, the network device can prepare for link recovery in advance, thereby further reducing a delay.

In some possible implementations, the fifth request information is carried on the second resource.

The fifth request information may be carried on the second resource. That is, the fifth request information occupies a same resource as the second request information. That is, the fifth request information may use a semi-static resource, thereby reducing resource overheads.

In some possible implementations, the method further includes: deactivating the second resource when the response information of the M cells is sent.

When all the M cells are successfully recovered, the network device may deactivate the second resource. For example, when the network device learns that the terminal device detects response information of the second request information corresponding to each of the M cells, or when the network device sends the response information of the second request information corresponding to each of the M cells, the network device may determine that all the M cells are successfully recovered. Alternatively, when the network device learns that the terminal detects response information of the second request information corresponding to some cells in the M cells and response information of the third request information corresponding to the other cells in the M cells, the network device determines that all the M cells are successfully recovered. Alternatively, when the network device sends the response information of the second request information corresponding to the some cells in the M cells and the response information of the third request information corresponding to the other cells in the M cells, the network device determines that all the M cells are successfully recovered. Alternatively, when the network device sends the response information of the third request information of each of the M cells, the network device determines that all the M cells are successfully recovered. It should be understood that, a manner in which the network device learns that the terminal detects the response information of the second request information or the response information of the third request information may be that the network device receives confirm information of a cell.

In some possible implementations, the network device re-receives the first request information on a fourth resource; and sends response information of the re-received first request information, where the response information of the re-received first request information is used to indicate a third resource; and the receiving third request information includes: receiving the third request information on the third resource.

In some possible implementations, the receiving third request information includes: receiving the third request information on the second resource.

The network device reuses a resource of the second request information, and receives the third request information sent by the terminal, thereby improving an overall link recovery speed.

In some possible implementations, the method further includes: receiving the first request information on the fourth resource; and sending response information of the first request information, where the response information of the first request information is used to indicate the third resource; and the receiving third request information includes: receiving the third request information on the third resource.

The third resource may be dynamically configured, thereby improving resource utilization.

In some possible implementations, the fourth resource is the same as the first resource.

For the first request information, a resource for transmitting the first request information may be static. That is, a resource occupied for initial transmission of the first request information may also be used to retransmit the first request information. No reallocation is needed, thereby saving time.

In some possible implementations, W≤X·L, W is a maximum value of a quantity of transmissions of the first request information, and X is a maximum value of a quantity of transmissions of request information of cell information of any one of the M cells.

Whether M is equal to 1 or is greater than 1 may depend on a size of the second resource configured by a base station or a status of a resource cell whose link fails. In this way, in the embodiments of this application, the terminal device can avoid frequently sending link failure recovery request information, thereby reducing power consumption overheads.

In some possible implementations, before the receiving second request information on a second resource, the method further includes: sending response information of the first request information, where the response information is used to indicate or activate the second resource.

That the response information of the first request information is used to activate the second resource means that when the terminal device needs to retransmit information about a cell whose link fails, the terminal device may no longer need to send retransmission information by using a resource allocated by the response information of the first request information, but directly sends the retransmission information on the second resource. A recovery delay can be effectively reduced.

That the response information of the first request information is used to indicate the second resource means that when the terminal device needs to retransmit the information about the cell whose link fails, the terminal device may further send retransmission information by using a resource dynamically allocated by the response information of the first request information. Resource overheads can be effectively reduced.

In some possible implementations, before the receiving second request information on a second resource, the method further includes: sending higher layer signaling, where the higher layer signaling is used to configure the second resource.

The second resource may be configured by the network device for the terminal, and is sent to the terminal by using the higher layer signaling or system information.

In some possible implementations, the second resource is a resource associated with the first resource or the first request information.

In this method, when the terminal device needs to retransmit information about a cell whose link fails, the terminal device may no longer need to send retransmission information by using a resource allocated by the response information of the first request information, but directly sends the retransmission information on the second resource. A link recovery delay can be effectively reduced, and a link recovery speed can be improved.

In some possible implementations, the method further includes: sending configuration information, where the configuration information is used to configure the first resource.

According to a third aspect, a link failure recovery method is provided. The method includes: sending first request information, where the first request information is used to indicate M cells whose links fail and/or N pieces of first reference signal information, the first reference signal information is used to recover a link of a cell whose link fails, M≥1, N≥1, and both M and N are integers; detecting response information of the M cells; sending second request information when no response information of an $i^{th}$ cell in the M cells is detected, where the second request information is used to indicate the $i^{th}$ cell and/or second reference signal information used to recover the $i^{th}$ cell, i is a positive integer, and 1≤i≤M.

In some possible implementations, when response information of a $j^{th}$ cell in the M cells is detected, the second request information is further used to indicate the $j^{th}$ cell and/or confirm information of the $j^{th}$ cell, where j is a positive integer, and 1≤j≤M.

In some possible implementations, the sending first request information includes: sending the first request information on a first resource, where the first resource is a grant-free PUSCH resource, or the first resource is a PUCCH resource.

In some possible implementations, the method further includes: receiving higher layer signaling, where the higher layer signaling is used to indicate the first resource.

In some possible implementations, a quantity of transmissions of request information used to indicate at least one of the M cells whose links fail and/or at least one of the N pieces of reference signal information is less than or equal to a preset quantity threshold or a quantity threshold configured by a network device.

In some possible implementations, before the sending first request information, the method further includes: determining that a link of at least one of the L cells fails; or determining that the link of at least one of the L cells fails and determining a reference signal used to recover the link of the at least one cell.

In some possible implementations, reference signal information that is in the second request information and that corresponds to a $k^{th}$ cell in the M cells whose links fail and that is indicated by the second request information is q pieces of reference signal information, 1≤k≤M, 1<q≤N, and both k and q are integers.

In some possible implementations, the detecting response information of the M cells includes: detecting, based on a priority sequence of the q pieces of reference signal information, response information corresponding to the $k^{th}$ cell.

In some possible implementations, the detecting, based on a priority sequence of the q pieces of reference signal information, response information corresponding to the $k^{th}$ cell includes: detecting, in a $p^{th}$ time window based on reference signal information whose priority ranks $p^{th}$ and that is in the q pieces of reference signal information, the response information corresponding to the $k^{th}$ cell, where 1≤p≤q.

In some possible implementations, the method further includes: sending fifth request information after no response information corresponding to the $k^{th}$ cell is detected in the $p^{th}$ time window based on the priority ranking $p^{th}$, where the fifth request information is used to indicate that no response information corresponding to the $k^{th}$ cell is detected in the $p^{th}$ time window.

In some possible implementations, the method further includes: after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

In some possible implementations, the fifth request information is carried on a second resource.

According to a fourth aspect, a link failure recovery method is provided. The method includes: receiving first request information, where the first request information is used to indicate M cells whose links fail and/or N pieces of first reference signal information, the first reference signal information is used to recover a link of a cell whose link fails, M≥1, N≥1, and both M and N are integers; and receiving second request information, where the second request information is used to indicate an $i^{th}$ cell and/or second reference signal information used to recover the $i^{th}$ cell, i is a positive integer, and 1≤i≤M.

In some possible implementations, before the receiving second request information, the method further includes: sending response information of a $j^{th}$ cell, where the second request information is further used to indicate the $j^{th}$ cell and/or confirm information of the $j^{th}$ cell, j is a positive integer, and 1≤j≤M.

In some possible implementations, the receiving first request information includes: receiving the first request information on a first resource, where the first resource is a grant-free PUSCH resource, or the first resource is a PUCCH resource.

In some possible implementations, the method further includes: sending higher layer signaling, where the higher layer signaling is used to indicate the first resource.

In some possible implementations, cell information of a $k^{th}$ cell in the M cells includes q pieces of first reference signal information, k is a positive integer, and 1<q≤N.

The cell information of the $k^{th}$ cell in the M cells may include a plurality of first reference signals. In other words, a network device may simultaneously receive a plurality of pieces of reference signal information to jointly recover the $k^{th}$ cell whose link fails, thereby further improving a probability of successful link recovery.

In some possible implementations, the sending response information of the M cells includes: sending, based on the q pieces of reference signal information, response information corresponding to the $k^{th}$ cell. The network device may send the response information based on the q reference signals in a beam sweeping manner, or the network device may send the response information based on one or more of the q reference signals simultaneously (in this case, the network device may have a plurality of panels).

In some possible implementations, the sending response information of the M cells includes: sending, based on a priority sequence of the q pieces of reference signal information, response information corresponding to the $k^{th}$ cell.

Priorities of the q pieces of reference signal information may be determined by the network device based on the success rates of recovering a link of the $k^{th}$ cell or quality of reference signals, may be determined based on a sequence of IDs of the reference signal information, or may be determined based on a sequence of reporting the reference signal information. The network device separately sends, based on the priority sequence of the q pieces of reference signal information, the response information corresponding to the $k^{th}$ cell. In this way, the probability of successful transmission of the response information, namely, the probability of successful link failure recovery, can be improved.

It should be understood that, in this embodiment, priorities of reference signal information may be equivalent to a sequence of success rates of recovering the link of the $k^{th}$ cell or a sequence of quality values of reference signals, or may be a sequence of IDs of the reference signal information or a sequence of reporting the reference signal information. There may be other description manners in the present invention. This is not limited.

In some possible implementations, the sending, based on a priority sequence of the reference signal information, response information corresponding to the $k^{th}$ cell includes: sending, in a $p^{th}$ time window based on reference signal information whose priority ranks $p^{th}$ and that is in the q pieces of reference signal information, the response information corresponding to the $k^{th}$ cell, where 1≤p≤q.

The network device may send, based on each of the q pieces of reference signal information, the response information corresponding to the $k^{th}$ cell in a corresponding time window. In this way, excessively long waiting duration for sending response information of the second request information based on a reference signal is avoided, and a relatively long link recovery delay caused by the excessively long waiting duration is avoided. That is, in the embodiments of this application, link recovery efficiency is improved, and a time length of link recovery is reduced.

In some possible implementations, the method further includes: receiving fifth request information, where the fifth request information is used to indicate that no response information corresponding to the $k^{th}$ cell is detected in the $p^{th}$ time window. The network device may learn, based on the fifth request information, of whether a terminal receives the response information, and learn that the terminal further continues to send request information. In this way, the network device can prepare for link recovery in advance, thereby further reducing a delay.

In some possible implementations, the fifth request information is carried on a second resource.

The fifth request information may be carried on the second resource. That is, the fifth request information occupies a same resource as the second request information. That is, the fifth request information may use a semi-static resource, thereby reducing resource overheads.

In some possible implementations, the method further includes: deactivating the second resource when the response information of the M cells is sent.

When all the M cells are successfully recovered, the network device may deactivate the second resource. For example, when the network device learns that the terminal device detects response information of the second request information corresponding to each of the M cells, or when the network device sends the response information of the second request information corresponding to each of the M cells, the network device may determine that all the M cells are successfully recovered. Alternatively, when the network device learns that the terminal detects response information of the first request information corresponding to some cells in the M cells and response information of the second request information corresponding to the other cells in the M cells, the network device determines that all the M cells are successfully recovered. Alternatively, when the network device sends the response information of the first request information corresponding to the some cells in the M cells and the response information of the second request information corresponding to the other cells in the M cells, the network device determines that all the M cells are successfully recovered. Alternatively, when the network device sends the response information of the second request information of each of the M cells, the network device determines that all the M cells are successfully recovered. It should be understood that, a manner in which the network device learns that the terminal detects the response information of the first request information or the response information of the second request information may be that the network device receives confirm information of a cell.

Whether M is equal to 1 or is greater than 1 may depend on a size of the first resource configured by a base station or a status of a resource cell whose link fails. In this way, in the embodiments of this application, the terminal device can avoid frequently sending link failure recovery request information, thereby reducing power consumption overheads.

According to a fifth aspect, a link failure recovery method is provided. The method includes: sending first request information on a first resource, where the first request information is used to indicate that a link of at least one of L cells fails, and L is an integer greater than 1; and sending M pieces of second request information, where each of the M pieces of second request information is used to indicate cell information of a cell whose link fails, M≥1, and M is an integer.

In some possible implementations, the cell information includes a cell identity of the corresponding cell whose link fails and first reference signal information used to recover the corresponding cell whose link fails.

In some possible implementations, the method further includes: detecting response information of the M pieces of second request information; and sending third request information when no response information corresponding to an $s^{th}$ piece of second request information in the M pieces of second request information is detected, where the third request information is used to indicate an $s^{th}$ cell and/or second reference signal information used to recover the $s^{th}$ cell, and $s \in \{1, 2, \ldots, M\}$.

In some possible implementations, reference signal information that corresponds to the $s^{th}$ cell and that is indicated by the $s^{th}$ piece of second request information in the M pieces of second request information is q pieces of reference signal information, 1≤s≤M, and k is an integer.

In some possible implementations, the detecting response information of the second request information includes: detecting, based on a priority sequence of the q pieces of reference signal information, response information of the second request information corresponding to the $s^{th}$ cell.

In some possible implementations, the detecting, based on a priority sequence of the q pieces of reference signal information, response information of the second request information corresponding to the $s^{th}$ cell includes: detecting the response information of the second request information in a $p^{th}$ time window based on reference signal information whose priority ranks $p^{th}$ and that is in the q pieces of reference signal information indicated by the second request information, where 1≤p≤q.

In some possible implementations, the method further includes: sending fifth request information after no response information of the second request information is detected in the $p^{th}$ time window based on the priority ranking p', where the fifth request information is used to indicate that no response information of the second request information is detected in the $p^{th}$ time window.

In some possible implementations, the method further includes: after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

In some possible implementations, a resource used for the fifth request information is the same as a resource used to carry the $s^{th}$ piece of second request information.

In some possible implementations, the sending M pieces of second request information includes: sending the $s^{th}$ piece of second request information on a second resource; and the sending third request information includes: sending the third request information on the second resource.

In some possible implementations, the method further includes: deactivating the second resource when response information of the $s^{th}$ cell is detected.

In some possible implementations, the second resource is configured by using higher layer signaling, or the second resource is a resource associated with the first resource or the first request information.

In some possible implementations, the method further includes: resending the first request information on a fourth resource; and
receiving response information of the resent first request information, where the response information of the resent first request information is used to indicate a third resource, where the sending third request information includes: sending the third request information on the third resource.

In some possible implementations, the fourth resource is the same as the first resource.

In some possible implementations, L≤W≤X·L, W is a maximum value of a quantity of transmissions of the first request information, and X is a maximum value of a quantity of transmissions of request information used to indicate the $s^{th}$ cell and/or cell information used to recover the $s^{th}$ cell.

In some possible implementations, the sending M pieces of second request information includes: sending the M pieces of second request information based on a priority of a cell corresponding to each of the M pieces of second request information.

In some possible implementations, the priority of the cell is determined based on a sequence of link failures, the priority of the cell is determined based on a value of an identity of the cell, or the priority of the cell is determined depending on whether the cell belongs to a primary cell or a secondary cell.

In some possible implementations, the method further includes: receiving configuration information, where the configuration information is used to indicate the first resource.

According to a sixth aspect, a link failure recovery method is provided. The method includes: receiving first request information on a first resource, where the first request information is used to indicate that a link of at least one of L cells fails, and L is an integer greater than 1; and receiving second request information, where the second request information is used to indicate cell information of a cell whose link fails, M≥1, and M is an integer.

In some possible implementations, the cell information includes a cell identity of the corresponding cell whose link fails and first reference signal information used to recover the corresponding cell whose link fails.

In some possible implementations, the method further includes: receiving third request information, where the third request information is used to indicate a cell identity of an $s^{th}$ cell and/or second reference signal information used to recover the $s^{th}$ cell, and $s \in \{1, 2, \ldots, M\}$.

In some possible implementations, the receiving second request information includes: receiving an $s^{th}$ piece of second request information on a second resource; and the receiving third request information includes: receiving the third request information on the second resource.

In some possible implementations, the method further includes: receiving the first request information on a fourth resource; and sending response information of the first request information, where the response information of the first request information is used to indicate a third resource; and the receiving third request information includes: receiving the third request information on the third resource.

In some possible implementations, the fourth resource is the same as the first resource.

In some possible implementations, before the receiving the second request information on a second resource, the method further includes: sending the response information of the first request information, where the response information is used to indicate or activate the second resource.

In some possible implementations, before the receiving the second request information on a second resource, the method further includes: sending higher layer signaling, where the higher layer signaling is used to configure the second resource.

In some possible implementations, the second resource is a resource associated with the first resource or the first request information.

In some possible implementations, the method further includes: sending configuration information, where the configuration information is used to configure the first resource.

In some possible implementations, cell information of a $k^{th}$ cell in an M cells includes q pieces of first reference signal information, k is a positive integer, and $1<q\leq N$.

The cell information of the $k^{th}$ cell in the M cells may include a plurality of first reference signals. In other words, a network device may simultaneously receive a plurality of pieces of reference signal information to jointly recover the $k^{th}$ cell whose link fails, thereby further improving a probability of successful link recovery.

In some possible implementations, the sending response information of the M cells includes: sending, based on the q pieces of reference signal information, response information corresponding to the $k^{th}$ cell. The network device may send the response information based on the q reference signals in a beam sweeping manner, or the network device may send the response information based on one or more of the q reference signals simultaneously (in this case, the network device may have a plurality of panels).

In some possible implementations, the sending response information of the M cells includes: sending, based on a priority sequence of the q pieces of reference signal information, response information corresponding to the $k^{th}$ cell.

Priorities of the q pieces of reference signal information may be determined by the network device based on success rates of recovering a link of the $k^{th}$ cell or quality of reference signals, may be determined based on a sequence of IDs of the reference signal information, or may be determined based on a sequence of reporting the reference signal information. The network device separately sends, based on the priority sequence of the q pieces of reference signal information, the response information corresponding to the $k^{th}$ cell. In this way, a probability of successful transmission of the response information of the second request information, namely, a probability of successful link failure recovery, can be improved.

It should be understood that, in this embodiment, priorities of reference signal information may be equivalent to a sequence of success rates of recovering the link of the $k^{th}$ cell or a sequence of quality values of reference signals, or may be a sequence of IDs of the reference signal information or a sequence of reporting the reference signal information. There may be other description manners in the present invention. This is not limited.

In some possible implementations, the sending, based on a priority sequence of the reference signal information, response information corresponding to the $k^{th}$ cell includes: sending, in a $p^{th}$ time window based on reference signal information whose priority ranks $p^{th}$ and that is in the q pieces of reference signal information, the response information corresponding to the $k^{th}$ cell, where $1\leq p\leq q$.

The network device may send, based on each of the q pieces of reference signal information, the response information corresponding to the $k^{th}$ cell in a corresponding time window. In this way, excessively long waiting duration for sending the response information of the second request information based on a reference signal is avoided, and a relatively long link recovery delay caused by the excessively long waiting duration is avoided. That is, in the embodiments of this application, link recovery efficiency is improved, and a time length of link recovery is reduced.

In some possible implementations, the method further includes: receiving fifth request information, where the fifth request information is used to indicate that no response information corresponding to the $k^{th}$ cell is detected in the $p^{th}$ time window. The network device may learn, based on the fifth request information, of whether a terminal receives the response information, and learn that the terminal further continues to send request information. In this way, the network device can prepare for link recovery in advance, thereby further reducing a delay.

In some possible implementations, the fifth request information is carried on the second resource.

The fifth request information may be carried on the second resource. That is, the fifth request information occupies a same resource as the second request information. That is, the fifth request information may use a semi-static resource, thereby reducing resource overheads.

In some possible implementations, the method further includes: deactivating the second resource when the response information of the M cells is sent.

When all the M cells are successfully recovered, the network device may deactivate the second resource. For example, when the network device learns that the terminal device detects response information of the second request information corresponding to each of the M cells, or when the network device sends the response information of the second request information corresponding to each of the M cells, the network device may determine that all the M cells are successfully recovered. Alternatively, when the network device learns that the terminal detects response information of the second request information corresponding to some cells in the M cells and response information of the third request information corresponding to the other cells in the M cells, the network device determines that all the M cells are successfully recovered. Alternatively, when the network device sends the response information of the second request information corresponding to those cells in the M cells and the response information of the third request information corresponding to the other cells in the M cells, the network device determines that all the M cells are successfully recovered. Alternatively, when the network device sends the response information of the third request information of each of the M cells, the network device determines that all the M cells are successfully recovered. It should be understood that a manner in which the network device learns that the terminal detects the response information of the second request information or the response information of the third request information may be that the network device receives confirm information of a cell.

In some possible implementations, the network device re-receives the first request information on a fourth resource; and sends response information of the resent first request information, where the response information of the resent first request information is used to indicate a third resource; and the receiving third request information includes: receiving the third request information on the third resource.

In some possible implementations, W≤X·L, W is a maximum value of a quantity of transmissions of the first request information, and X is a maximum value of a quantity of transmissions of request information of cell information of any one of the M cells.

Whether M is equal to 1 or is greater than 1 may depend on a size of the second resource configured by a base station or a status of a resource cell whose link fails. In this way, in the embodiments of this application, the terminal device can avoid frequently sending link failure recovery request information, thereby reducing power consumption overheads.

According to a seventh aspect, a transmission resource determining apparatus is provided. The apparatus may be a terminal, or may be a chip in the terminal. The apparatus has a function of implementing the first aspect, the third aspect, or the fifth aspect, and various possible implementations. The function may be implemented by hardware, or may be implemented by hardware executing corresponding software. The hardware or the software includes one or more modules corresponding to the function.

In a possible design, the apparatus includes a processing module and a transceiver module. The transceiver module may be, for example, at least one of a transceiver, a receiver, and a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, so that the apparatus performs the method according to any one of the first aspect, the third aspect, the fifth aspect, or the possible implementations of the first aspect, the third aspect, or the fifth aspect.

In another possible design, when the apparatus is a chip, the chip includes a processing module. Optionally, the chip further includes a transceiver module. The transceiver module may be, for example, an input/output interface, a pin, or a circuit on the chip. The processing module may be, for example, a processor. The processing module may execute instructions, to enable the chip in the terminal to perform the communication method according to any one of the first aspect, the third aspect, the fifth aspect, or the possible implementations of the first aspect, the third aspect, or the fifth aspect.

Optionally, the processing module may execute instructions in a storage module, and the storage module may be a storage module in the chip, for example, a register or a buffer. The storage module may alternatively be located inside a communication device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (application-specific integrated circuit, ASIC), or one or more integrated circuits configured to control program execution of the communication methods according to the foregoing aspects.

According to an eighth aspect, an apparatus is provided. The apparatus may be a network device, or may be a chip in the network device. The apparatus has a function of implementing the second aspect, the fourth aspect, or the sixth aspect, and various possible implementations. The function may be implemented by hardware, or may be implemented by hardware executing corresponding software. The hardware or the software includes one or more modules corresponding to the function.

In a possible design, the apparatus includes a transceiver module. Optionally, the apparatus further includes a processing module. The transceiver module may be, for example, at least one of a transceiver, a receiver, and a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, so that the apparatus performs the communication method according to any one of the second aspect, the fourth aspect, or the sixth aspect, and various possible implementations. In this design, the apparatus may be a network device.

In another possible design, when the apparatus is a chip, the chip includes a transceiver module. Optionally, the apparatus further includes a processing module. The transceiver module may be, for example, an input/output interface, a pin, or a circuit on the chip. The processing module may be, for example, a processor. The processing module may execute instructions, to enable the chip in the network device to perform the communication method according to any one of the second aspect, the fourth aspect, the sixth aspect, or the possible implementations of the second aspect, the fourth aspect, or the sixth aspect. Optionally, the processing module may execute instructions in a storage module, and the storage module may be a storage module in the chip, for example, a register or a buffer. The storage module may alternatively be located inside a communication device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the communication methods according to the foregoing aspects.

According to a ninth aspect, a computer storage medium is provided. The computer storage medium stores program code. The program code is used to indicate instructions for performing the method according to any one of the first aspect, the third aspect, the fifth aspect, or the possible implementations of the first aspect, the third aspect, or the fifth aspect.

According to a tenth aspect, a computer storage medium is provided. The computer storage medium stores program code. The program code is used to indicate instructions for performing the method according to any one of the second aspect, the fourth aspect, the sixth aspect, or the possible implementations of the second aspect, the fourth aspect, or the sixth aspect.

According to an eleventh aspect, a computer program product including instructions is provided. When the computer program product runs on a computer, the computer is enabled to perform the method according to any one of the first aspect, the third aspect, the fifth aspect, or the possible implementations of the first aspect, the third aspect, or the fifth aspect.

According to a twelfth aspect, a computer program product including instructions is provided. When the computer program product runs on a computer, the computer is enabled to perform the method according to any one of the second aspect, the fourth aspect, the sixth aspect, or the possible implementations of the second aspect, the fourth aspect, or the sixth aspect.

According to a thirteenth aspect, a communication system is provided. The communication system includes an apparatus that has a function of implementing the method and the possible designs in the first aspect and an apparatus that has a function of implementing the method and the possible designs in the second aspect.

According to a fourteenth aspect, a communication system is provided. The communication system includes an apparatus that has a function of implementing the method and the possible designs in the third aspect and an apparatus that has a function of implementing the method and the possible designs in the fourth aspect.

According to a fifteenth aspect, a communication system is provided. The communication system includes an apparatus that has a function of implementing the method and the possible designs in the fifth aspect and an apparatus that has a function of implementing the method and the possible designs in the sixth aspect.

According to a sixteenth aspect, a processor is provided, where the processor is configured to be coupled to a memory, and is configured to perform the method according to any one of the first aspect to the sixth aspect or the possible implementations of the first aspect to the sixth aspect.

According to a seventeenth aspect, a chip is provided. The chip includes a processor and a communication interface. The communication interface is configured to communicate with an external component or an internal component. The processor is configured to implement the method according to any one of the first aspect, the third aspect, the fifth aspect, or the possible implementations of the first aspect, the third aspect, or the fifth aspect.

Optionally, the chip may further include a memory. The memory stores instructions. The processor is configured to execute the instructions stored in the memory or instructions from another module. When the instructions are executed, the processor is configured to implement the method according to any one of the first aspect, the third aspect, the fifth aspect, or the possible implementations of the first aspect, the third aspect, or the fifth aspect.

Optionally, the chip may be integrated into a terminal.

According to an eighteenth aspect, a chip is provided. The chip includes a processor and a communication interface. The communication interface is configured to communicate with an external component or an internal component. The processor is configured to implement the method according to any one of the second aspect, the fourth aspect, the sixth aspect, or the possible implementations of the second aspect, the fourth aspect, or the sixth aspect.

Optionally, the chip may further include a memory. The memory stores instructions. The processor is configured to execute the instructions stored in the memory or instructions from another module. When the instructions are executed, the processor is configured to implement the method according to any one of the second aspect, the fourth aspect, the sixth aspect, or the possible implementations of the second aspect, the fourth aspect, or the sixth aspect.

Optionally, the chip may be integrated into a network device.

Based on the foregoing technical solutions, the terminal may send the first request information to the network device on the same resource (namely, the first resource) when detecting that a link of any one of a plurality of cells fails or links of any more than one of the plurality of cells fail, to notify the network device that the link of at least one of the L cells fails. In this way, in the multi-carrier scenario, compared with the resource overheads in the solution in which when the link of each cell fails, one resource is occupied to send one piece of request information, the resource overheads are reduced in the embodiments of this application.

DESCRIPTION OF EMBODIMENTS

Figure 1:
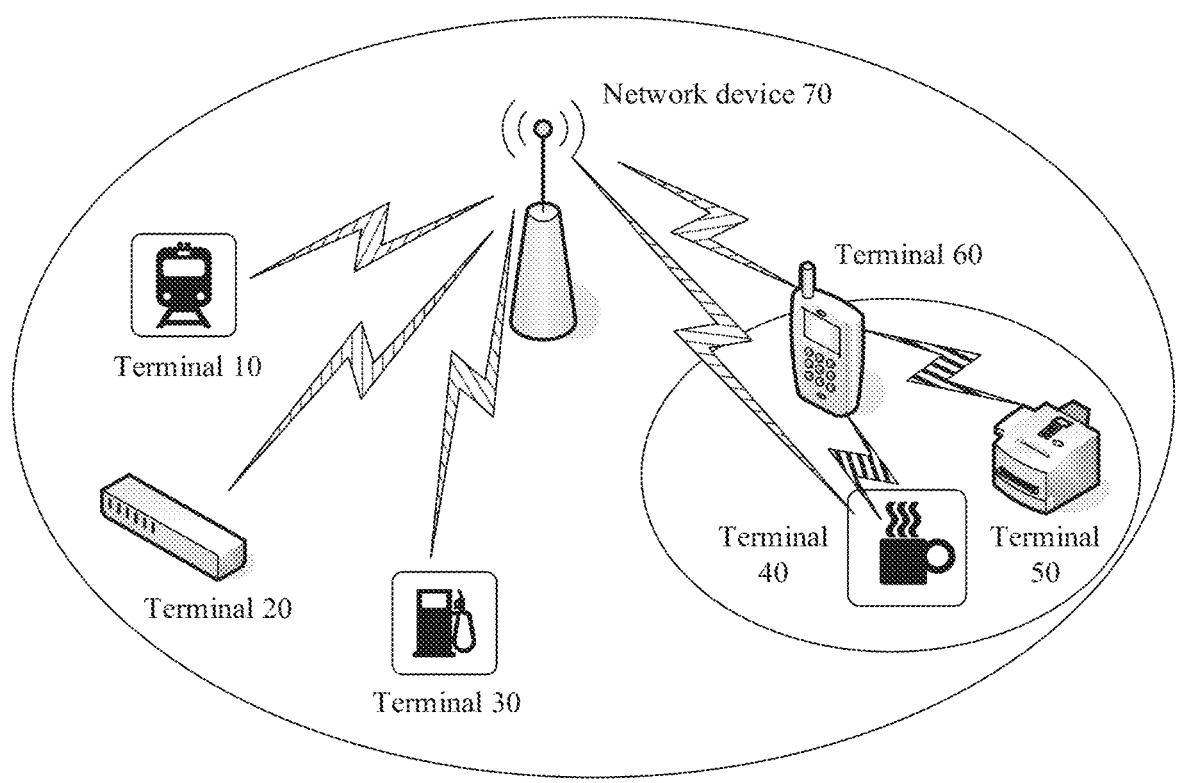
FIG. 1 is a schematic diagram of a communication system according to this application.

The following describes technical solutions in this application with reference to accompanying drawings.

The technical solutions in embodiments of this application may be applied to various communications system, for example, a global system for mobile communication (GSM) system, a code division multiple access (CDMA) system, a wideband code division multiple access (WCDMA) system, a general packet radio service (general packet radio service, GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or a new radio (NR) system.

A terminal device in the embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network or a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communication (GSM) system or the code division multiple access (CDMA) system, a NodeB (NB) in the wideband code division multiple access (WCDMA) system, an evolved NodeB (eNB or eNodeB) in the LTE system, or a radio controller in a cloud radio access network (CRAN) scenario. Alternatively, the network device may be a relay station, an access point, a vehicle-mounted device, a wearable device, a network device in the future 5G network, a network device in the future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing by using a process (process). For example, the operating system is a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in the embodiments of this application is not specifically limited in the embodiments of this application, provided that a program that records code of the method provided in the embodiments of this application can be run to perform communication based on the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus, or a product that uses standard programming and/or engineering technologies. "Product" may cover a computer program that is accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or another machine-readable medium that are/is configured to store information. The term "machine-readable media" may include but is not limited to a radio channel and various other media that can store, include, and/or carry instructions and/or data.

FIG. 1 is a schematic diagram of a communication system according to this application. The communication system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communication system. The terminal 60 may send downlink signals to the terminal 40 and the terminal 50, or may receive uplink signals sent by the terminal 40 and the terminal 50.

It should be noted that the embodiments of this application may be applied to a communication system including one or more network devices, or may be applied to a communication system including one or more terminals. This is not limited in this application.

To facilitate understanding of this application, the following describes terms related to this application.

1. Control Resource Set (CORESET)

To improve efficiency of blindly detecting a control channel by a terminal device, the concept of the control resource set is proposed in an NR standard formulation process. A network device may configure one or more resource sets for the terminal device, to send a physical downlink control channel (PDCCH). The network device may send a control channel to the terminal device on any control resource set corresponding to the terminal device. In addition, the network device further needs to notify the terminal device of another configuration, for example, a search space set, associated with the control resource set. Configuration information of all control resource sets varies. For example, frequency-domain widths vary, or time-domain lengths vary. It is extensible that the control resource set in this application may be a CORESET, a control region, or an enhanced physical downlink control channel (ePDCCH) set (set) that is defined in a 5G mobile communication system.

A time-frequency location occupied by the PDCCH may be referred to as a downlink control region. In LTE, the PDCCH is always located in the first m (possible values of m are 1, 2, 3, and 4) symbols of a subframe. It should be noted that an E-PDCCH and an R-PDCCH in LTE are not located in the first m symbols.

In NR, the downlink control region may be flexibly configured by using RRC signaling by using the control resource set (CORESET) and the search space set (search space set).

Information such as a frequency domain location of the PDCCH or a control channel element (CCE) and a quantity (where a maximum value is 3) of continuous time-domain symbols may be configured in the control resource set.

Information such as a PDCCH detection periodicity and offset and a start symbol in a slot may be configured in the search space set.

For example, if it may be configured in the search space set that a PDCCH periodicity is one slot and a start symbol in time domain is a symbol 0, the terminal device may detect the PDCCH at a start location of each slot.

2. Quasi Co-Location (QCL) Assumption Information

Quasi co-site/quasi co-location QCL assumption information may also be referred to as QCL information. The QCL information is used to assist in describing receiving beamforming information by the terminal device and a receiving procedure.

The QCL information is used to indicate a QCL relationship between two types of reference signals. A target reference signal may be usually a demodulation reference signal (DMRS), a channel state information reference signal (CSI-RS), or the like. A referenced reference signal or a source reference signal may be usually a CSI-RS, a tracking reference signal (TRS), a synchronization signal/physical broadcast channel block (SSB), or the like.

Spatial relation: Spatial relation information is used to assist in describing beamforming information on a transmit side of the terminal device and a transmit procedure.

The spatial relation information is used to indicate a spatial transmit parameter relationship between two types of reference signals. The target reference signal may be usually a DMRS, an SRS, or the like, and the referenced reference signal or the source reference signal may be usually a CSI-RS, an SRS, an SSB, or the like.

It should be understood that spatial characteristic parameters of two reference signals or channels that satisfy a QCL relationship are the same, so that a spatial characteristic parameter of the target reference signal can be inferred based on a resource index of the source reference signal.

It should be further understood that spatial characteristic parameters of two reference signals or channels that satisfy spatial relation information are the same, so that the spatial characteristic parameter of the target reference signal can be inferred based on the resource index of the source reference signal.

A spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, spatial channel correlation, transmit beamforming of the network device, receive beamforming of the network device, an average channel gain, an average channel delay (average delay), a delay spread, a Doppler spread, a Doppler shift, a spatial reception parameter (spatial Rx parameter), or the like.

These spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that the terminal device may receive the target reference signal based on information about a receive beam for the source reference signal indicated by the QCL information. These spatial characteristic parameters further help the terminal device complete transmit-side beamforming or a transmission processing process based on the spatial relation information. It should be understood that the terminal device may transmit the target reference signal based on information about a transmit beam for the source reference signal indicated by the spatial correlation information.

To reduce QCL information indication overheads of the network device for the terminal device, in an optional implementation, the network device may indicate that a demodulation reference signal of the PDCCH or a physical downlink shared channel (PDSCH) and one or more of a plurality of reference signal resources previously reported by the terminal device satisfy a QCL relationship. For example, the reference signal may be a CSI-RS. Herein, an index of each reported CSI-RS resource corresponds to one transmit-receive beam pair previously established during measurement performed based on the CSI-RS resource. It should be understood that information about receive beams for the two reference signals or channels that satisfy the QCL relationship is the same, and the terminal device may infer, based on indexes of the reference signal resources, information about receive beams for receiving the PDCCH or the PDSCH.

Four types of QCL are defined in an existing standard, and the network device may simultaneously configure one or more types of QCL for the terminal device, for example, QCL types A+D, and C+D.

QCL types A: Doppler shift, Doppler spread, average delay, and delay spread

QCL types B: Doppler shift and Doppler spread

QCL types C: average delay and Doppler shift

QCL types D: Spatial Rx parameter

In an example of this application, correspondences of some parameters may also be used to describe a QCL scenario.

It should be understood that a scenario in this application and applicable to QCL assumption may alternatively be an association relationship between two reference signals, or may further be an association relationship between transmission objects.

3. Transmission Configuration Indicator (TCI) State

One TCI state (TCI state) may include one or two referenced reference signals and an associated QCL type. The QCL type may further be classified into four categories:

A, B, C, and D that are different combinations or selections of {Doppler shift, Doppler spread, average delay, delay spread, and spatial Rx parameter}. The TCI state includes the QCL information, or the TCI state is used to indicate QCL information.

4. Synchronization Signal/Physical Broadcast Channel Block (Synchronous Signal/PBCH Block, SS/PBCH Block)

The SS/PBCH block may also be referred to as an SSB. PBCH is an abbreviation of a physical broadcast channel. The SSB includes at least one of a primary synchronization signal (PSS), a secondary synchronization signal (SSS), and a PBCH. The SSB is a signal mainly used for cell searching, cell synchronization, and carrying broadcast information.

5. Beam:

The beam is a communication resource, and different beams may be considered as different communication resources. The different beams may be used to send same information, or may be used to send different information. The beam may correspond to at least one of a time domain resource, a space resource, and a frequency domain resource.

Optionally, a plurality of beams having a same type of communication feature may be considered as one beam, and one beam may include one or more antenna ports, configured to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

Specifically, the beam may be a wide beam, may be a narrow beam, or may be a beam of another type. A beam forming technology may be a beamforming technology or another technical means. This is not limited in this application. Through the beamforming (Beamforming) technology, a higher antenna array gain may be implemented by being oriented to a specified direction in space. In addition, beams may be classified into a transmit beam and a receive beam of the network device and a transmit beam and a receive beam of the terminal. The transmit beam of the network device is used to describe beamforming information on a transmit side of the network device, and the receive beam of the network device is used to describe beamforming information on a receive side of the network device. The transmit beam of the terminal is used to describe beamforming information on the transmit side of the terminal, and the receive beam of the terminal is used to describe beamforming information on a receive side.

More specifically, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change of an analog beam direction. Therefore, one RF chain can only generate one analog beam at a same moment. In addition, for communication based on the analog beam, a beam at a transmit end and a beam at a receive end need to be aligned. Otherwise, a signal cannot be normally transmitted.

It should be understood that one or more antenna ports forming one beam may also be considered as one antenna port set.

It should be further understood that the beam may be further represented by using a spatial filter (spatial filter) or a spatial transmission filter (spatial domain transmission filter). In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal device may also be referred to as an "uplink spatial filter", and the transmit beam of the network device or the receive beam of the terminal device may also be referred to as a "downlink spatial filter". Selection of N optimal beam pairs (Beam pair link, BPL) (one BPL includes one transmit beam of the network device and one receive beam of the terminal, or one BPL includes one transmit beam of the terminal and one receive beam of the network device) is used by the terminal to select the transmit beam of the network device and/or the receive beam of the terminal based on beam sweeping performed by the network device, and used by the network device to select the transmit beam of the terminal and/or the receive beam of the network device based on beam sweeping performed by the terminal.

Specifically, the transmit beam may be a base station transmit beam or a terminal transmit beam. When the transmit beam is the base station transmit beam, a base station sends reference signals to UE through different transmit beams, and the UE receives, through a same receive beam, the reference signals sent by the base station through the different transmit beams, determines an optimal base station transmit beam based on the received signals, and then feeds back the optimal base station transmit beam to the base station, so that the base station updates the transmit beam. When the transmit beam is the terminal transmit beam, the UE sends reference signals to the base station through different transmit beams, and the base station receives, through a same receive beam, the reference signals sent by the UE through the different transmit beams, determines an optimal UE transmit beam based on the received signals, and then feeds back the optimal UE transmit beam to the UE, so that the UE updates the transmit beam. The process of sending the reference signals by using different transmit beams may be referred to as beam sweeping, and the process of determining the optimal transmit beam based on the received signals may be referred to as beam matching.

The receive beam may be a base station receive beam or a terminal receive beam. When the receive beam is the base station receive beam, the UE sends reference signals to the base station through a same transmit beam, and the base station receives, through different receive beams, the reference signals sent by the UE, and then determines an optimal base station receive beam based on the received signals, to update the base station receive beam. When the receive beam is the UE receive beam, the base station sends reference signals to the UE through a same transmit beam, and the UE receives, through different receive beams, the reference signals sent by the base station, and then determines an optimal UE receive beam based on the received signals, to update the UE receive beam.

It should be noted that for downlink beam training, the network device configures a type of a reference signal resource set for beam training. When a repetition parameter configured for the reference signal resource set is "on", the terminal device assumes that reference signals in the reference signal resource set are transmitted by using a same downlink spatial filter, that is, are transmitted by using a same transmit beam. In this case, usually, the terminal device receives the reference signals in the reference signal resource set by using different receive beams, and obtains a best receive beam of the terminal device through training. Optionally, the terminal device may report best channel quality that is of N reference signals and that is measured by the UE. When the repetition parameter configured for the reference signal resource set is "off", the terminal device does not assume that the reference signals in the reference signal resource set are transmitted by using the same downlink spatial filter, that is, does not assume that the network device transmits the reference signals by using the same transmit beam. In this case, the terminal device selects N best beams from the resource set by measuring channel quality of the reference signals in the set, and feeds back the N best beams to the network device. Usually, in this case, the terminal device uses a same receive beam in this process.

6. Bandwidth Part (BWP)

The network device may configure one or more downlink/uplink bandwidth parts for the terminal device. The BWP includes consecutive PRBs in frequency domain, and the BWP is one subset in a bandwidth of the terminal device. A minimum granularity of the BWP in frequency domain is one PRB. A system may configure one or more bandwidth parts for the terminal device, and the plurality of bandwidth areas may overlap in frequency domain.

In a single-carrier scenario, one terminal device can only have one active BWP at a same moment, and the terminal device can only receive data/a reference signal or send data/a reference signal in the active BWP (active BWP).

In this application, in a case applicable to a BWP scenario, a specified BWP may alternatively be a bandwidth set on a specific frequency, or a set including a plurality of RBs.

7. Reference Signal Configured for Detecting a Link Failure and Recovering the Link Failure To detect and recover a link fault, the network device needs to configure, for the terminal device, a reference signal resource set (for example, a beam failure detection RS resourceconfig, a beam failure detection RS, or failure detection resources) used for beam failure detection and a reference signal resource set (a candidate beam RS list, a candidate beam RS identification resource, a beam failure candidate beam resource, or a candidate beam identification RS) (also referred to as a candidate reference signal resource set) used to recovery a link between the terminal device and the network device. In addition, a reference signal used to detect the link failure may alternatively be implicitly indicated, and a reference signal associated with a TCI indicating a PDCCH is used as the reference signal for detecting the link failure. The reference signal is a reference signal that satisfies a QCL relationship with a DMRS on the PDCCH and that is periodically sent. An RS in a beam failure detection RS set and the demodulation reference signal on the physical downlink control channel PDCCH satisfy the QCL relationship or use a same TCI state as the PDCCH. When channel quality information (for example, reference signal received power (RSRP), a channel quality indicator (CQI), a block error rate (BLER), a signal to interference plus noise ratio (SINR), and a signal-to-noise ratio (SNR)) of some or all reference signals in the set is less than a preset threshold, it is determined that a communication link is faulty. Being less than the preset threshold may be being less than the preset threshold for W consecutive times or being less than the preset threshold for W times in a time period. Optionally, the preset threshold may be the same as a radio link failure out-of-synchronization (radio link failure OOS (out of sync)) threshold.

8. Concepts Related to Cell Carriers:

Carrier Aggregation (CA):

A plurality of consecutive or non-consecutive component carriers are aggregated into a larger bandwidth (for example, up to 100 MHz), thereby satisfying a bandwidth requirement of 3GPP.

Component Carrier (CC):

Each carrier in multi-carrier aggregation may be referred to as a "CC". Each carrier includes one or more physical resource blocks (PRB). There may be a corresponding physical downlink control channel (PDCCH) on each carrier, and the PDCCH is used to schedule a physical downlink shared channel (PDSCH) on the respective CC. Alternatively, there may be no PDCCH, but the PDSCH is scheduled by using a PDCCH on another CC. When the terminal may receive data on a plurality of CCs, the CCs may also be referred to as component carriers, component carriers, component carriers, or the like.

Primary Cell (PCell):

The PCell is a cell on which a CA terminal camps, and the CA terminal corresponds to a physical uplink control channel (PUCCH) channel.

Primary Secondary Cell (PSCell):

The PSCell is a special secondary cell that is on a secondary eNodeB (secondary eNodeB, SeNB) and that is configured by a master eNodeB (master eNodeB, MeNB) for DC UE by using RRC connection signaling.

Secondary Cell (SCell):

The SCell is a cell configured for the CA terminal by using RRC connection signaling, works on an SCC (secondary component carrier), and may provide more radio resources for the CA terminal. In the SCell, there may be only a downlink or both the downlink and an uplink.

Special cell (SpCell):

In a dual connectivity (dual connectivity, DC) scenario, the SpCell is a PCell in a master cell group (MCG) or a PSCell in a secondary cell group (SCG). Otherwise, in a CA scenario, the SpCell is a PCell.

MCG/SCG:

MCG is a group to which a cell that provides a service for the terminal and that is in the master eNodeB belongs, and is a master cell group. In a dual connectivity mode, a group of serving cells associated with the MeNB includes a PCell and one or more SCells.

The SCG is a group to which a cell that provides a service for the UE and that is in the secondary eNodeB belongs, and is a secondary cell group. In the dual connectivity mode, a PSCell and zero or a plurality of SCells are included.

MeNB/SeNB:

The MeNB is a base station to which a cell on which a DC terminal camps belongs.

The SeNB is another base station configured by the MeNB for the DC UE by using RRC connection signaling.

In the embodiments of this application, a communication failure may also be referred to as a communication link failure, a communication link fault, a link fault, a link failure, a communication fault, a beam failure, a beam fault, or the like. In the embodiments of this application, these concepts have a same meaning. The communication failure may mean that signal quality of a reference signal used for PDCCH beam failure detection is less than or equal to a preset threshold. After the communication link is faulty, the terminal device needs to select, from a candidate reference signal resource set, a reference signal resource whose channel quality information (such as RSRP, RSRQ, a CQI, and an SINR) is greater than the preset threshold, to recover the communication link.

Optionally, the preset threshold may be configured by the network device. Herein, the beam failure detection RS is used by the terminal device to detect channel quality of a transmit beam of the network device, and the transmit beam is a beam used when the network device communicates with the terminal device.

The candidate beam identification RS is a reference signal set used by the terminal device to initiate link reconfiguration after the terminal device determines that a communications link fault occurs on the transmit beam of the network device.

In the embodiments of this application, communication failure recovery may also be referred to as recovery of communication between the network device and the terminal device, communication fault recovery, link failure recovery, link fault recovery, beam failure recovery, beam fault recovery, communication link failure recovery, communication link fault recovery, link reconfiguration, or the like.

In one implementation, the two sets, namely, the reference signal resource set used for the beam failure detection and the reference signal resource set used to recover the link between the terminal device and the network device may alternatively have other names. This is not specifically limited in this application.

In the embodiments of this application, communication failure recovery request information may also be referred to as communication fault recovery request information, link failure recovery request information, link fault recovery request information, beam failure recovery request information, beam fault recovery request information, communication link failure recovery request information, communication link fault recovery request information, link reconfiguration request information, reconfiguration request information, or the like. It should be understood that, in the embodiments of this application, the communication failure recovery request information may be referred to as first request information, second request information, and/or third request information.

In the embodiments of this application, communication failure recovery response information may also be referred to as communication failure response information, beam failure recovery response information, beam failure response information, communications link fault recovery response information, communications link fault response information, communications link failure recovery response information, communications link failure response information, beam fault recovery response information, beam fault response information, link reconfiguration response information, link fault recovery response information, link fault response information, link failure recovery response information, link failure response information, communication fault recovery response information, communication fault response information, reconfiguration response information, or the like. It should be understood that in this application, the communication failure recovery response information may be referred to as response information for short.

In the embodiments of this application, optionally, a communication failure recovery request may mean sending a signal on a resource used to carry the communication failure recovery request. The communication failure recovery response information may mean receiving, on a control resource set and/or a search space set that are/is used to send a communication failure recovery response, downlink control information (downlink control information, DCI) whose cyclic redundancy check (CRC) is scrambled by using a cell radio network temporary identifier (C-RNTI). The communication failure recovery response information may alternatively be DCI scrambled by using other information (for example, DCI scrambled by using a BFR-RNTI). The communication failure recovery response information may alternatively be data scheduled by using the DCI. The communication failure recovery response information may alternatively be an ACK of the data scheduled by using the DCI. The communication failure recovery response information may alternatively be one of the following information: DCI scrambled by using the cell radio network temporary identifier C-RNTI, DCI scrambled by using a modulation and coding scheme cell radio network temporary identifier MCS-C-RNTI, downlink control information DCI in dedicated search space, DCI scrambled by using a dedicated radio network temporary identifier RNTI, DCI scrambled by using a random access radio network temporary identifier RA-RNTI, DCI including a preset state value, DCI including transmission configuration indicator TCI information, quasi co-location QCL indication information of the cell whose link fails, or DCI in a preset format, where the DCI in the preset format indicates newly transmitted data. This is not limited in the embodiments of this application.

It should be understood that in the embodiments of this application, the communication failure, the communication failure recovery, the communication failure recovery request information, and the communication failure recovery response information may alternatively have other names. This is not specifically limited in this application.

It should be understood that, in this application, that a link of a cell fails to be recovered may be understood as that the terminal device no longer sends the first request information, the second request information, and/or the third request information that correspond/corresponds to the cell, may be understood as stopping link failure recovery clock timing, or may be understood as stopping link failure recovery counter counting or the like. Alternatively, that a link of a cell fails to be recovered may be understood as that no response information of the cell is received yet when a link failure recovery clock corresponding to the cell expires and/or counting of a link failure recovery counter exceeds a maximum quantity of times or reaches the maximum quantity of times. The link failure recovery counter is used to count a quantity of times that the link failure recovery request information is sent. Optionally, a media access control (media access control, MAC) layer of the terminal device maintains a link failure recovery timer and a link failure recovery counter. The link failure recovery timer is used to control an entire time length of link failure recovery. The link failure recovery counter is used to limit a quantity of times that the terminal device sends a link failure recovery request. When the link failure recovery counter reaches a maximum value, the terminal device considers that link failure recovery fails, and stops a link failure recovery process. A time length of recovery of the recovery timer and a count value of the recovery counter may be configured by the network device, or may be preset values.

It should be understood that, in this application, that a link of a cell is successfully recovered may be understood as that the terminal device detects response information of the cell.

It should be understood that "detection" in the embodiments of this application may be understood as "receiving", or may be understood as "decoding".

It should be understood that in this application, a time unit may be one or more radio frames, one or more subframes, one or more slots, one or more mini slots (mini slot), one or more orthogonal frequency division multiplexing (OFDM) symbols, or the like defined in an LTE system or a 5G NR system, or may be a time window including a plurality of frames or subframes, for example, a system information (SI) window.

It should be understood that, in the embodiments of this application, interaction between the terminal device and the network device is generally corresponding. To be specific, the terminal device sends information, and correspondingly, the network device also receives the information. Alternatively, the network device sends information, and correspondingly, the terminal device also receives the information. Further, physical resources used by the network device and the terminal device to send and receive information or rules, for example, periodicities or priority sequences applied by the network device and the terminal device to send and receive the information are also corresponding. This is not limited in the embodiments of this application.

Figure 2:
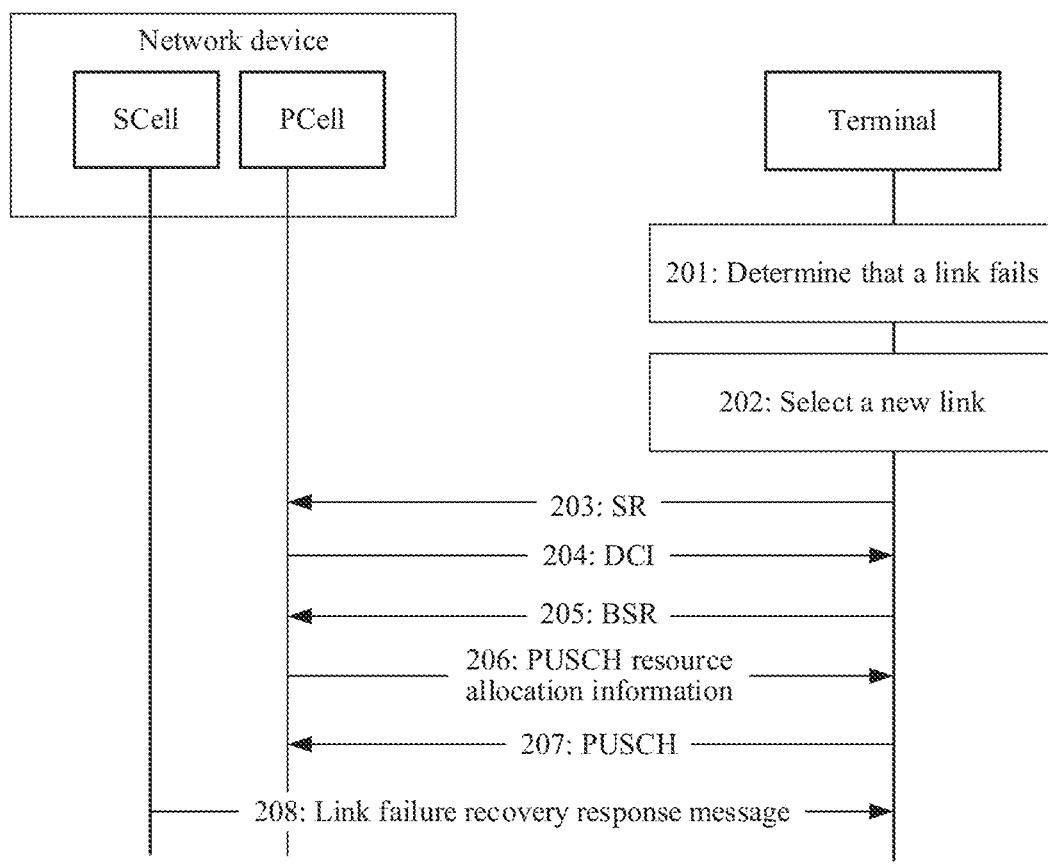
FIG. 2 is a schematic flowchart of link failure recovery in a conventional solution.

FIG. 2 is a schematic flowchart of link failure recovery in a conventional solution.

201: A terminal detects a working status of a current link. For example, the terminal may detect that the current link fails.

It should be understood that a link in this application may be understood as a "beam". That is, the terminal fails to transmit a signal by using a current beam.

For example, when the terminal device determines that channel quality information of a beam failure detection RS or channel quality information of all or some reference signals in a beam failure detection RS set is less than or equal to a second preset threshold for N consecutive times, the terminal device may determine that a link between the terminal device and a network device is faulty.

It should be understood that, in the embodiments of this application, a manner in which the terminal device determines that the link between the terminal device and the network device is faulty is not limited to the foregoing example, and that the link between the terminal device and the network device is faulty may alternatively be determined in another determining manner. No limitation is imposed on this in this application.

202: The terminal selects a new link. That is, the terminal selects a new beam.

For example, the terminal device determines, based on channel quality information of a candidate reference signal set (RSs), a reference signal (anew identified beam) whose channel quality is greater than or equal to a first preset threshold, where the determining process herein may be determining performed by measuring the channel quality information of the candidate reference signal set.

203: After selecting the new link, the terminal sends a scheduling request (scheduling request, SR) to the network device, where the SR is used to request the network device to configure an uplink resource.

204: After the network device receives the SR, because the network device cannot learn of a volume of uplink data that needs to be transmitted by the terminal, the network device sends downlink control information to the terminal, where the downlink control information is used to schedule an uplink resource for transmitting a buffer status report (BSR).

205: The terminal sends the BSR on the uplink resource indicated by the downlink control information, where the BSR is used to indicate a value of the data volume of the data to be sent by the terminal.

206: The network device sends resource allocation information to the terminal based on the value of the data volume of the data to be sent by the terminal, where the resource allocation information is used to indicate a resource for transmitting a PUSCH.

207: The terminal sends the PUSCH on the resource indicated by the resource allocation information, and the PUSCH carries downlink information and an index of a cell whose link fails.

208: If the terminal receives link failure recovery response information, the terminal determines that link failure recovery succeeds.

However, if the terminal receives no link failure recovery response information, link failure recovery fails, so that link communication is interrupted, and communication efficiency is reduced.

Figure 3:
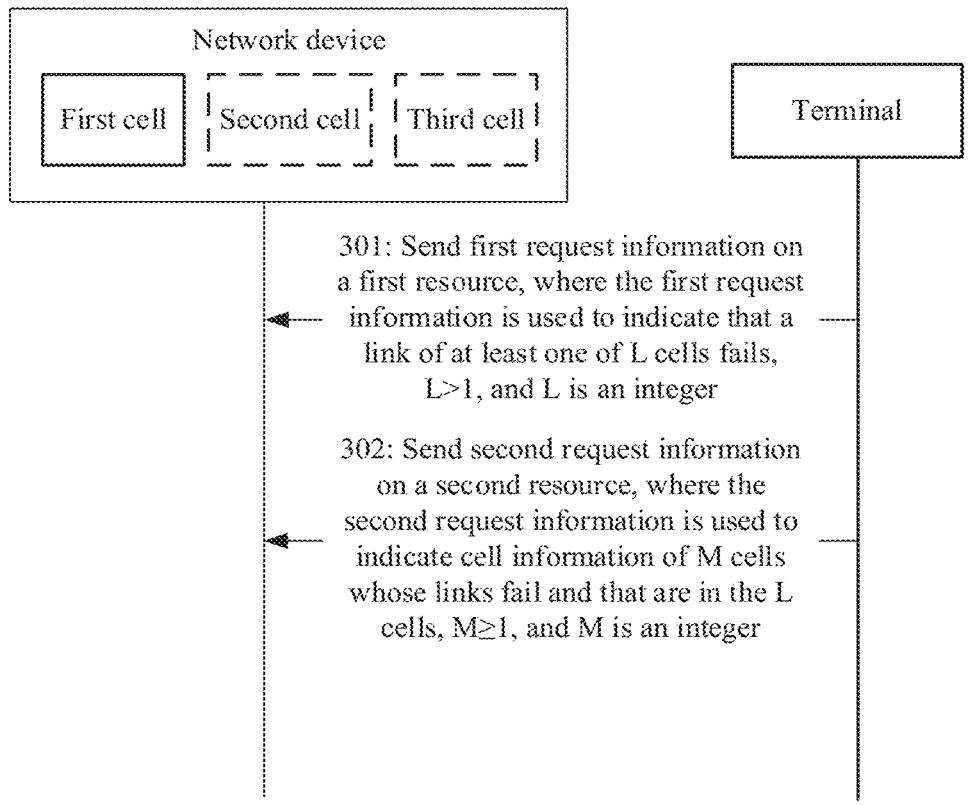
FIG. 3 is a schematic flowchart of a link failure recovery method according to an embodiment of this application.

FIG. 3 is a schematic flowchart of a link failure recovery method according to an embodiment of this application.

301: A terminal sends first request information on a first resource, where the first request information is used to indicate that a link of at least one of L cells fails, L>1, and L is an integer. Correspondingly, a network device receives the first request information.

Specifically, the terminal may send the first request information to the network device on a same resource (namely, the first resource) when detecting that a link of any one of the L cells fails or links of any more than one of the L cells fail, to notify the network device that the link of at least one of the L cells fails. In this way, in a multi-carrier scenario, compared with resource overheads in a solution in which when a link of each cell fails, one resource is occupied to send one piece of request information, resource overheads are reduced in the embodiments of this application.

It should be noted that each of the L cells may separately correspond to one network device, some of the L cells may correspond to one network device, or the L cells may correspond only to one network device. This is not limited in this application.

It should be further noted that a value of L may be agreed on by the network device and the terminal in advance (for example, predefined by using a protocol), may be indicated by the network device, or may be reported by a terminal capability.

It should be understood that the first request information may be a "BFRQ 1". The BFRQ 1 may be information in a same format as the scheduling request (SR).

Optionally, the terminal may trigger step 301 when determining that the link of at least one of the L cells fails.

Optionally, the terminal may alternatively trigger step 301 when determining that the link of at least one of the L cells fails and identifying new reference signal information used to recover the link of the at least one cell.

The first resource may be a PUCCH resource, may be a PRACH resource, or may be a PUSCH resource or the like. The first resource may be a resource used for sending beam failure recovery request information, or may be a resource used for another function, for example, a resource for reporting beam information (related information of an L1-RSRP or an L1-SINR) in a beam management process or a resource for reporting CQI-related information (for example, one or more of the following information: a PMI, an RI, a CQI, a CRI, and the like) in a CSI obtaining phase. The first resource may be a periodic resource, or may be a semi-persistent resource.

302: The terminal sends second request information on a second resource, where the second request information is used to indicate cell information of M cells whose links fail and that are in the L cells, M≥1, and M is an integer. Correspondingly, the network device receives the second request information.

Specifically, the second request information is used to indicate cell identities of the M cells whose links fail and that are in the L cells. In this way, the network device can learn, based on the second request information, of related information of a specific cell whose link fails and that is in the L cells. When M=1, the second request information may be used to indicate cell information of any one of the L cells whose link fails. In this way, compared with resource overheads in a solution in which different resources are occupied by request information of each cell to send the second request information, resource overheads are reduced. When M≥1, the second request information may be used to indicate cell information of a plurality of cells whose links fail. In this way, compared with a recovery delay in a solution in which request information of each of the M cells is separately sent or asynchronously sent, a recovery delay is reduced in the embodiments of this application.

It should be noted that the second request information may explicitly indicate the cell identities of the M cells whose links fail and that are in the L cells, for example, directly carry the cell identities. The second request information may further implicitly indicate the cell identities of the M cells whose links fail and that are in the L cells. For example, an association relationship between a cell and a second resource is configured by using the network device, and the terminal device implicitly notifies, by selecting a second resource for sending the second request information, the network device of a cell whose link fails (for example, a first cell is associated with a second resource a, a second cell is associated with a second resource b, and the terminal device sends the second request information by using the second resource b after finding that a link of the second cell fails, to implicitly indicate that the link of the second cell fails).

It should be understood that the second request information may be a "BFRQ 2".

Optionally, cell information may include a cell identity and/or reference signal information used to recover a cell.

Specifically, the cell information of the M cells may include the cell identities of the M cells and/or N pieces of first reference signal information used to recover the M cells. One or more first reference signals may recover one cell, or a same first reference signal may recover a plurality of cells. This is not limited in this application. In addition, there may be a mapping relationship between a cell identity and first reference signal information. In this way, when the cell information of the M cells includes only the cell identities of the M cells, the network device can determine a corresponding first reference signal based on the identities of the M cells. Alternatively, when the cell information of the M cells includes only N first reference signals, the network device can determine a corresponding cell identity based on the N first reference signals. Optionally, when a reference signal resource set used to recover a link failure of an $i^{th}$ cell is configured, and/or the terminal device identifies a reference signal that is in the set and whose quality is greater than a preset threshold, the cell information of the M cells may include an identity of the $i^{th}$ cell and first reference signal information for recovering the $i^{th}$ cell. Otherwise, the cell information of the M cells includes the identity of the $i^{th}$ cell, and may further include status information of a reference signal that does not recover the $i^{th}$ cell. That is, the terminal does not identify reference signal information used to recover the $i^{th}$ cell.

Optionally, the second resource may be a PUCCH resource, may be a PUSCH resource, or may be a PRACH resource or the like.

It should be understood that "reference signal information" in the embodiments of this application may be the "beam" described above, or may be quasi co-location (quasi co-location, QCL) assumption information.

In an optional implementation, M may be greater than 1. The terminal device may determine, based on a size of the second resource and/or a quantity of cells whose links fail in a current network, a quantity (one or more) of failed cells whose cell information is to be sent. In this implementation, when links of a plurality of cells fail, the terminal device may send cell information of the plurality of cells whose links fail, that is, may recover the links of the plurality of cells simultaneously, thereby effectively reducing a link recovery delay of the plurality of cells.

In another optional implementation, M can only be equal to 1. That is, regardless of a quantity of cells whose links fail, the second request information of the terminal device can only carry cell information of one cell whose link fails. In this method, the second resource allocated by the network device may be relatively small, and resource overheads are reduced.

For the foregoing two implementations, if the quantity of cells whose links fail in the current network is greater than a quantity of cell information that can be carried by the second resource, the terminal device may select, based on the following cell priorities, specific cells whose links fail and whose cell information is preferentially sent by using the second request information.

Optionally, a priority of the cell may be determined based on a sequence of link failures. For example, a priority of a cell whose link fails first is higher than a priority of a cell whose link fails later. Alternatively, a priority of the cell may be determined based on a value of an identity of the cell. For example, a priority of a cell whose identity is smaller is higher than a priority of a cell whose identity is larger. Alternatively, a priority of the cell may be determined depending on whether the cell belongs to a primary cell or a secondary cell. For example, a priority of the primary cell is higher than a priority of the secondary cell. Alternatively, a priority of the cell may be determined based on a bandwidth (an occupied frequency domain resource) of the cell. For example, a priority of a cell occupying a larger bandwidth is higher than a priority of a cell occupying a smaller bandwidth. Alternatively, a priority of the cell may be determined by a quantity of cells that use same QCL information as or satisfy a QCL relationship with the cell. For example, a priority of a cell that uses more same QCL information is higher than a priority of a cell that uses less same QCL information. For example, if QCL information of a PDCCH of a cell 1 is the same as that of two cells, and QCL information of a PDCCH of a cell 2 is the same as that of no cell, a priority of the cell 1 is higher than a priority of the cell 2.

Optionally, after step 302, the terminal may detect response information of the M cells, and send third request information based on a detection result.

Specifically, after the terminal sends the second request information, each cell performs link recovery based on the second request information. After the network device receives second request information of a cell (for example, a $j^{th}$ cell), the network device corresponding to the $j^{th}$ cell may feedback response information of the second request information to the terminal. If the terminal device receives the response information of the second request information, the terminal device considers that link recovery succeeds. If after the terminal device sends second request information of a cell (for example, the $i^{th}$ cell), the network device receives no second request information of the $i^{th}$ cell, or the network device receives the request information and sends response information of the second request information, but the terminal device detects no response information of the second request information, the terminal may resend cell information of the $i^{th}$ cell until a maximum quantity of transmissions of the cell information exceeds a preset value or a time length of recovery of the $i^{th}$ cell exceeds preset duration. In this case, the network device considers that a link of the $i^{th}$ cell is not successfully recovered. When the terminal detects no response information of the second request information corresponding to the $i^{th}$ cell, the terminal sends, to the network device, the third request information including a cell identity of the $i^{th}$ cell and/or second reference signal information used to recover the $i^{th}$ cell. In this way, after receiving the third request information, the network device continues to recover the link of the $i^{th}$ cell. When the terminal detects the response information of the second request information corresponding to the $j^{th}$ cell, the terminal sends, to the network device, the third request information including confirm information of the $j^{th}$ cell. In this way, the network device can learn that a link of the $j^{th}$ cell is successfully recovered, so that the second resource can be deactivated, and a resource waste is avoided. Alternatively, the second resource (which may be configured to transmit other information, or be deactivated to others for transmitting uplink data or an uplink signal) can be deactivated in time when a link of the network device or all links of the M cells are successfully recovered. In other words, the terminal sends the third request information regardless of whether the terminal detects or does not detect response information of second request information corresponding to a cell.

It should be noted that, if the terminal receives no response information of the third request information of some cells yet after sending the third request information, in the embodiments of this application, the terminal may further continue to send the request information, to recover links of the cells. For example, the terminal may keep sending the request information until the links of the corresponding cells are successfully recovered or a quantity of times that the terminal sends the request information (of the cells) exceeds a preset value (for example, a maximum value of a quantity of transmissions) and/or a time length of link failure recovery of the terminal exceeds preset duration (for example, a link failure recovery timer expires). Alternatively, if all SCells except a successfully recovered SCell receive no response information yet when request information of the SCells is transmitted for a maximum quantity of times, or when beam failure recovery (beam failure recovery, BFR) timers (timer) corresponding to all the SCells except the successfully recovered SCell expire, a resource of the BFRQ 2 is deactivated (deactivate). Alternatively, if UE can successfully receive the response information of the $i^{th}$ cell (it may be considered that link failure recovery of the $i^{th}$ cell succeeds), a link failure recovery timer of the cell may be stopped. The request information may be understood as cell information. For example, when it is determined that links of all cells indicated in the first request information or the second request information are successfully recovered, the second resource may be deactivated. Alternatively, when it is determined that links of some of all cells indicated in the first request information or the second request information are successfully recovered, and a link of a remaining cell fails to be recovered, the second resource may be deactivated. Alternatively, when determining that links of all cells indicated in the first request information or the second request information fail to be recovered, the UE may deactivate the second resource. That a link of a cell is successfully recovered may mean receiving response information of the cell. That a link of a cell fails to be recovered may mean that response information of the cell is not received yet when request information of the cell is sent for a maximum quantity of times or more and/or a time length of recovering a link of the cell exceeds preset duration.

In another implementation, the terminal device sends the third request information only when no response information of at least one of the M cells is detected. Otherwise, the UE does not send the third request information.

It should be noted that the first reference signal information and the second reference signal information may be different. In other words, the first cell cannot be recovered by using first reference signal information for a cell (for example, the first cell), and second reference signal information needs to be newly identified to recover the first cell.

It should be noted that a value of i may be the same as a value of j. In other words, the embodiments of this application describe feedback statuses of a same cell in different scenarios in which link recovery succeeds or fails.

It should be understood that the $i^{th}$ cell or the $j^{th}$ cell may be any one of the M cells.

It should be further understood that the third request information may be an "RE-BFRQ 2", or may be retransmission information of the second request information.

Optionally, the confirm information of the $j^{th}$ cell may include a cell identity (cell ID) and/or a confirm identity of the $j^{th}$ cell.

Optionally, the third request information includes a cell identity of a cell whose link fails to be recovered and that is in the M cells, second reference signal information used to recover the cell whose link fails to be recovered, and confirm information of a cell whose link is successfully recovered and that is in the M cells.

Specifically, the third request information includes the cell identity of the $i^{th}$ cell whose link fails to be recovered and that is in the M cells, the second reference signal information used to recover the $i^{th}$ cell, and the confirm information of the $j^{th}$ cell whose link is successfully recovered and that is in the M cells. A cell identity of a cell whose link fails to be recovered and a second reference signal used to recover the cell whose link fails to be recovered may be carried in a same piece of third request information as confirm information of a cell whose link is successfully recovered. In other words, reference signal information used to indicate re-identification of the cell whose link fails to be recovered and confirm information indicating the successfully recovered cell are sent by using a same piece of request information, thereby reducing signaling overheads.

It should be noted that the third request information may include cell information of all or some of cells whose links fail to be recovered and that are in the M cells, and may further include confirm information of all or some of cells whose links are successfully recovered and that are in the M cells.

Figure 4:
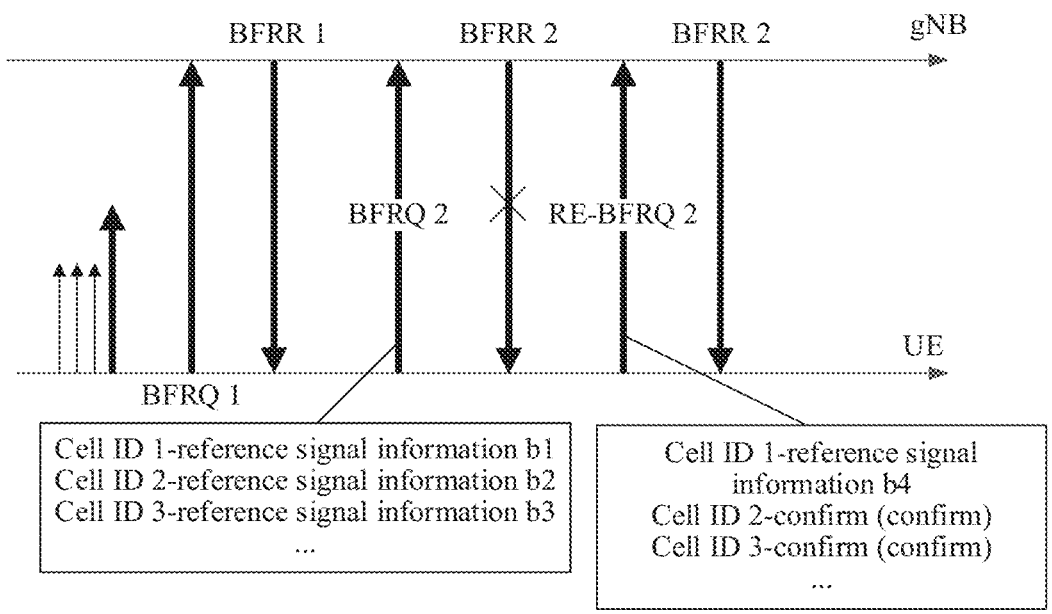
FIG. 4 is a schematic diagram of a link failure recovery method according to a embodiment of this application.

For example, as shown in FIG. 4, the terminal sends the first request information (the BFRQ 1) and sends the second request information BFRQ 2. The BFRQ 2 may include cell identities of M cells whose links fail and first reference signal information corresponding to each cell, namely, cell ID1-reference signal information b1, cell ID 2-reference signal information b2, cell ID 3-reference signal information b3, . . . , and cell ID M-reference signal information bM. When response information (BRRR 2) of BFRQs 2 corresponding to the cell ID 2 and the cell ID 3 is detected, and no response information (BRRR 2) of a BFRQ 2 corresponding to the cell ID 1 is detected, the third request information (the RE-BFRQ 2) may include cell ID 1-reference signal information b4, a cell ID 2-confirm identity, a cell ID 3-confirm identity, and the like.

Optionally, the terminal may further receive response information of the first request information, where the response information of the first request information is used to indicate or activate the second resource.

Specifically, in an implementation, after receiving the first request information, the network device may further send the response information of the first request information. The response information of the first request information may be used to indicate the second resource allocated to the terminal. That is, the network device allocates a resource to the terminal. The second resource may be an aperiodic resource (or referred to as a dynamic resource). In this method, the network device determines, depending on whether there is a cell (indicated by using the first request information) whose link fails in the current network, whether to allocate the second resource. If the network device receives the first request information, it can be learned that there is the cell whose link fails in the current network, and the network device may dynamically allocate the second resource, so that the terminal device further reports cells whose links fail, and/or reports information (first reference signal information) of new links of the cells whose links fail to be recovered. Because a link failure event is an unexpected event, in this method, a periodic resource for sending link failure recovery request information does not need to be reserved in advance, so that resource overheads can be effectively reduced.

In another implementation, the response information of the first request information may be further used to activate the second resource. That is, the second resource originally allocated to the terminal is triggered and activated by the response information of the first request information. The activated second resource is a semi-static resource (semi-persistent) or a static resource (periodic). For example, the second resource may be a semi-static resource or a static resource (for example, a physical uplink shared channel (PUSCH), a physical uplink control channel (PUCCH) or a physical random access channel (PRACH)) activated by the response information of the first request information after the first request information or downlink control information (DCI) signaling after the first request information. In this method, the network device determines, depending on whether there is a cell (indicated by using the first request information) whose link fails in the current network, whether to activate the second resource. If the network device receives the first request information, it can be learned that there is the cell whose link fails in the current network, and the network device activates the second resource, so that the terminal device further reports cells whose links fail, and/or reports information (first reference signal information) of new links of the cells whose links fail to be recovered. If the links are successfully recovered, the resource can be deactivated in time. If the links fail to be recovered, the terminal device may continue to send the second request information on the resource, and may deactivate the second resource until link failure recovery succeeds, a quantity of times of sending a link failure recovery request reaches a maximum preset value, or link failure recovery duration reaches preset duration. In this method, when the terminal device needs to retransmit information about a cell whose link fails, the terminal device may no longer need to send retransmission information by using a resource allocated by the response information of the first request information, but directly sends the retransmission information on the second resource. A recovery delay can be effectively reduced.

Optionally, the second resource may be configured by using higher layer signaling or system information, or may be a preset resource.

Specifically, the second resource may be configured by the network device for the terminal, and sent to the terminal by using the higher layer signaling or the system information. Alternatively, the second resource may be agreed on by the network device and the terminal device in advance, or may be set by the terminal in advance. This is not limited in this application. In this method, when the terminal device needs to retransmit information about a cell whose link fails, the terminal device may no longer need to send retransmission information by using a resource allocated by the response information of the first request information, but directly sends the retransmission information on the second resource. A link recovery delay can be effectively reduced, and a link recovery speed can be improved.

Optionally, the second resource may alternatively be a resource associated with the first resource.

Specifically, there may be a mapping relationship between the second resource and the first resource. In this way, when learning of the first resource, the terminal can determine the second resource. Optionally, the association relationship between the first resource and the second resource may be configured by using system information such as a master information block (MIB) or a system information block (SIB), or configured by using radio resource control (RRC) signaling or media access control (MAC)-control element (CE) signaling. The system information or the signaling may be sent before the first request information is sent. Optionally, configuration of the first resource and the second resource may alternatively be configured by using the foregoing system information or signaling. In this method, when the terminal device needs to retransmit information about a cell whose link fails, the terminal device may no longer need to send retransmission information by using a resource allocated by the response information of the first request information, but directly sends the retransmission information on the second resource. A link recovery delay can be effectively reduced, and a link recovery speed can be improved.

It should be noted that the network device may configure a plurality of resources for the terminal to transmit the first request information, and configure a plurality of resources for the terminal to transmit the second request information. The terminal may select one or more resources from the plurality of resources used to transmit the first request information as the first resource, and may further select one or more resources from the plurality of resources used to transmit the second request information as the second resource. The plurality of resources used to transmit the first request information and the plurality of resources used to transmit the second request information may be respectively configured by using the system information such as the MIB or the SIB, or configured by using signaling such as the RRC signaling or the MAC-CE signaling.

Optionally, the second resource may alternatively be a resource associated with the first request information. Optionally, the network device may configure, by using the system information such as the MIB or the SIB, or by using the RRC signaling or the MAC-CE signaling, a plurality of resources used to send the first request information, a plurality of resources used to send the second request information, and an association relationship between the plurality of resources used to send the first request information and the plurality of resources used to send the second request information. The terminal may select one resource from the plurality of resources used to transmit the first request information as the first resource, and may further select one resource from the plurality of resources used to transmit the second request information as the second resource. Each first resource may be associated with one or more second resources, and sizes of second resources associated with all first resources may be different. The terminal device sends the second request information on a second resource associated with a first resource on which the terminal device sends the first request information.

Optionally, the terminal may send the third request information on the second resource.

Specifically, the terminal may reuse a resource for sending the second request information to send the third request information, and does not need to wait for the response information of the first request information to reallocate a resource to send the third request information, thereby reducing a time length of resource allocation, and improving an overall link recovery speed.

It should be understood that, that the third request information and the second request information occupy a same second resource may be understood as that both the resource carrying the second request information and the resource carrying the third request information are a periodic or semi-persistent resource configured by the network device. It may also be understood that the resource carrying the second request information and the resource carrying the third request information are repetitions of a same frequency domain resource in different time units. In addition, the resource occupied by the third request information and the resource occupied by the second request information may alternatively be resources at different locations in a same resource block.

It should be understood that, that the terminal reuses the resource for sending the second request information to send the third request information may be understood as that the terminal uses a static or semi-static (semi-persistent or semi-static) resource for sending the second request information to send the third request information.

Optionally, when detecting all response information of the M cells, the terminal deactivates the second resource.

Specifically, when all the M cells are successfully recovered, the terminal may deactivate the second resource. For example, when detecting response information of the second request information corresponding to each of the M cells, the terminal may determine that all the M cells are successfully recovered. Alternatively, when detecting response information of the second request information corresponding to some cells in the M cells and response information of the third request information corresponding to the other cells in the M cells, the terminal determines that all the M cells are successfully recovered. Alternatively, when detecting response information of the third request information of each of the M cells, the terminal determines that all the M cells are successfully recovered.

Optionally, if the terminal device determines that K1 of the M cells fail to be recovered, K2 of the M cells are successfully recovered, and K1+K2=M, the terminal device deactivates the second resource, where both K1 and K2 are integers greater than or equal to 0. The cell recovery failure means that if a quantity of times that the terminal device sends link failure recovery request information of the cell exceeds a preset value (a maximum value), and/or a time length of recovering a link of the cell exceeds preset duration, it is considered that the link of the cell fails to be recovered. The cell recovery success means that the terminal device receives response information of link failure recovery of the cell.

Optionally, when response information of at least one cell is not received when the terminal detects the response information of the M cells, the terminal may resend the first request information on a fourth resource, and receive response information of the resent first request information. The response information of the resent first request information is used to indicate a third resource, so that the terminal may send the third request information on the third resource. In other words, the third resource may be dynamically configured. For example, the network device indicates the third resource by using the response information of the resent first request information.

Optionally, the fourth resource may be the same as the first resource. In other words, for the first request information, a resource for transmitting the first request information may be static. That is, a resource occupied for initial transmission of the first request information may also be used to retransmit the first request information. No reallocation is needed, thereby saving time.

Optionally, cell information of a $k^{th}$ cell in the M cells includes q pieces of first reference signal information, k is a positive integer, and $1 < q \leq N$.

Specifically, the cell information of the $k^{th}$ cell in the M cells may include a plurality of first reference signals. In other words, the terminal may simultaneously send a plurality of pieces of reference signal information to jointly recover the $k^{th}$ cell whose link fails, thereby further improving a probability of successful link recovery. Particularly in a scenario in which multi-beam transmission is supported (for example, a terminal has a plurality of antenna panels (panel)), the plurality of reference signals are used to simultaneously recover a link. In addition, the terminal device reports a plurality of candidate reference signals that are used to recover a link, and may use the plurality of reference signals to asynchronously recover a link, thereby effectively reducing a delay caused by retransmitting the second request information after one reference signal fails to recover the link, and improving recovery efficiency.

It should be understood that cell information of each of the M cells may include a plurality of pieces of first reference signal information, or cell information of some of the M cells includes a plurality of pieces of first reference signal information. This is not limited in this application.

It should be further understood that the cell information of the $k^{th}$ cell may further include a cell identity of the $k^{th}$ cell.

Optionally, that the terminal detects response information of second request information corresponding to the $k^{th}$ cell in the M cells may be detecting the response information of the second request information based on a priority sequence of the q pieces of reference signal information.

Specifically, priorities of the q pieces of reference signal information may be determined by the terminal based on success rates of recovering a link of the $k^{th}$ cell or quality of reference signals, may be determined based on a sequence of IDs of the reference signal information, or may be determined based on a sequence of reporting the reference signal information. The terminal may separately detect, based on the priority sequence of the q pieces of reference signal information, the response information corresponding to the $k^{th}$ cell. In this way, a probability of successful transmission of response information of the second request information, namely, a probability of successful link failure recovery, can be improved.

It should be understood that, in this embodiment, priorities of reference signal information may be equivalent to a sequence of success rates of recovering the link of the $k^{th}$ cell or a sequence of quality values of reference signals, or may be a sequence of IDs of the reference signal information or a sequence of reporting the reference signal information. There may be other description manners in the present invention. This is not limited.

Optionally, the terminal may detect, based on each of the q pieces of reference signal information, the response information corresponding to the $k^{th}$ cell in a corresponding time window. In this way, excessively long waiting duration for detecting the response information of the second request information based on a reference signal is avoided, and a relatively long link recovery delay caused by the excessively long waiting duration is avoided. That is, in the embodiments of this application, link recovery efficiency is improved, and a time length of link recovery is reduced. For example, the response information of the second request information is detected in a $p^t$ time window based on reference signal information whose priority ranks $p^{th}$, where $1 \leq p \leq q$.

It should be noted that different reference signal information may have different priorities, and different priorities may have a sequence. That the terminal detects the response information based on reference signal information in a priority sequence may be understood as that the terminal detects the response information based on a sequence of priorities of the reference signal information.

Optionally, that the terminal detects the response information of the second request information based on the priority sequence of the q pieces of reference signal information may be that when the response information of the second request information fails to be detected based on a previous piece of reference signal information (for example, a $p^{th}$ piece of reference signal information), the response information of the second request information is detected based on a next piece of reference signal information (for example, a $(p+1)^{th}$ piece of reference signal information), to further reduce signaling overheads.

Figure 5:
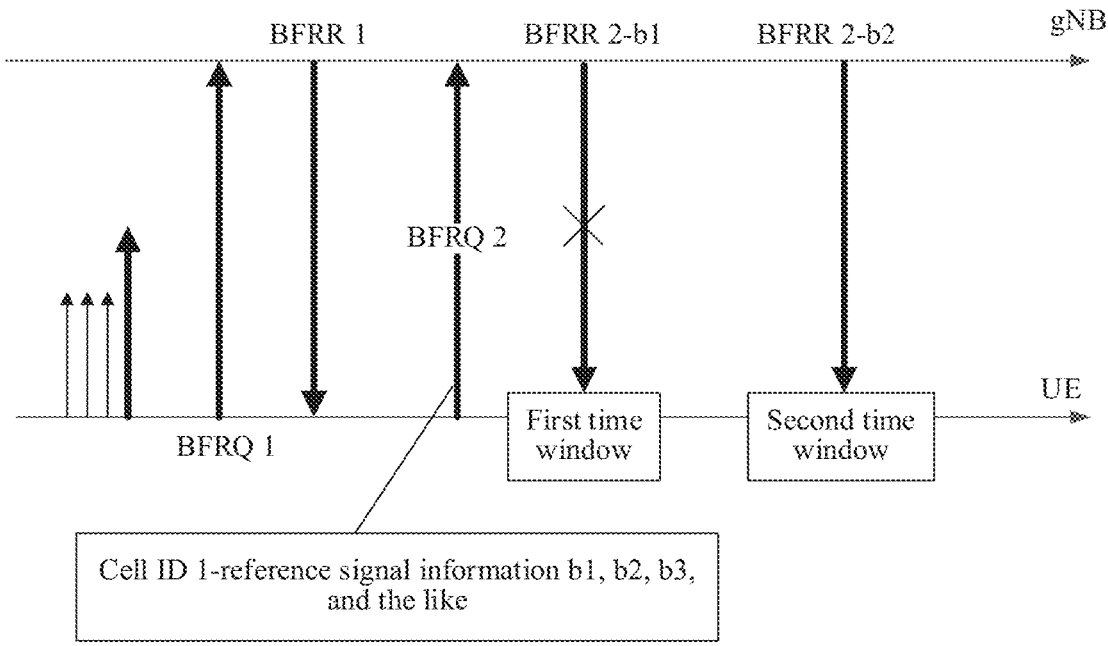
FIG. 5 is a schematic diagram of a link failure recovery method according to another embodiment of this application.

It should be noted that the terminal may also separately detect the $p^{th}$ piece of reference signal information and the $(p+1)^{th}$ piece of reference signal information in corresponding time windows. For example, as shown in FIG. 5, the BFRQ 2 includes an identity (cell ID k) of the $k^{th}$ cell and reference signal information b1, b2, b3, and the like used to recover the $k^{th}$ cell. The terminal detects response information (BFRR 2-b1) of the second request information in a first time window based on the reference signal information b1. If no BFRR 2-b1 is detected in the first time window, response information (BFRR 2-b2) of the second request information is detected in a second time window based on the reference signal information b2. If the BFRR 2-b1 is detected in the first time window, subsequent detection may not need to be performed.

It should be understood that, after receiving response information of the second request information, the terminal may receive at least one of a physical downlink shared channel (PDSCH), a physical downlink control channel (PDCCH), a PUCCH, a PUSCH, a sounding reference signal (SRS), a channel state information (CSI) reference signal (RS), and a tracking reference signal (TRS) by using first reference signal information corresponding to the response information Optionally, in an implementation, the terminal detects response information of the second request information based on one piece of reference signal information (for example, the $p^{th}$ piece of reference signal information). If no response to the second request information is detected, the terminal may further send fifth request information to the network device. The fifth request information is used to indicate that no response information of the second request information corresponding to the $p^{th}$ reference signal is detected, or is used to indicate that no response information of the second request information corresponding to the $p^{th}$ reference signal is detected in the $p^{th}$ time window corresponding to the $p^{th}$ reference signal information. In this implementation, after receiving the fifth request information, the network device learns that the terminal device detects no response information of the second request information corresponding to the $p^{th}$ piece of reference signal information. Then, the network device may send response information of the second request information based on the $(p+1)^{th}$ piece of reference signal information. Otherwise, if the fifth request information is not received within a specified time length, the network device may consider that link recovery succeeds. The network device may no longer send response information of the second request information. Optionally, a start location of a $(p+1)^{th}$ time window corresponding to the $(p+1)^{th}$ piece of reference signal information is located in Y time units that are after the fifth request information is sent. Y is greater than or equal to 0.

It should be understood that the foregoing method may be further extended to a case in which the terminal detects the response information of the second request information based on a group of reference signal information (including two or more pieces of reference signal information).

Optionally, the fifth request information may be carried on the second resource. That is, the fifth request information occupies a same resource as the second request information. That is, the fifth request information may use a semi-static resource, thereby reducing resource overheads.

Optionally, the fifth request information may be carried on the first resource. That is, the fifth request information occupies a same resource as the first request information. That is, the fifth request information may use a semi-static resource, thereby reducing resource overheads. The fifth request information may have a same format as the first request information.

Optionally, in another implementation, the terminal detects response information of the second request information based on one piece of reference signal information (for example, the $p^{th}$ piece of reference signal information). If a response to the second request information is detected, the terminal may further send confirm information to the terminal device. The confirm information is used to indicate that the response information of the second request information corresponding to the $p^{th}$ reference signal is detected, or is used to indicate that the response information of the second request information is detected in the $p^{th}$ time window corresponding to the $p^{th}$ reference signal information. After receiving the confirm information, the network device may deactivate the second resource in time, stop, in time, sending the response information, or learn that link failure recovery succeeds, thereby effectively reducing resource overheads. Optionally, the confirm information may be carried on the second resource, that is, occupies a same resource as the second request information. That is, the confirm information may use a semi-static resource, thereby reducing resource overheads. If no response information of the second request information is detected based on the $p^{th}$ piece of reference signal information, the response information of the second request information is detected (in the second time window) based on the $(p+1)^{th}$ piece of reference signal information.

Optionally, a maximum value W of a quantity of transmissions of the first request information may have a magnitude relationship with a maximum value X of a quantity of transmissions of request information used to indicate cell information of a cell.

It should be understood that the request information used to indicate the cell information of the cell may include the second request information and/or the third request information.

In an optional implementation, the second resource is a periodic resource (which may also be a static resource) or a semi-persistent resource (which may also be a semi-static resource), and M>1 or M=1 is allowed. In this implementation, W≤X·L. Whether M is equal to 1 or greater than 1 may depend on a size of a second resource configured by a base station or a status of a resource cell whose link fails. This implementation can prevent the terminal device from frequently sending the link failure recovery request information. The frequently sending costs electricity.

In another optional implementation, the second resource is a periodic resource (which may also be a static resource) or a semi-persistent resource (which may also be a semi-static resource), M=1, and L≤W≤X·L. In this way, it can be ensured that each cell whose link fails has an opportunity to send the second request information, or it can be ensured that each cell has a same opportunity to recover a link, and the terminal device can be prevented from frequently sending the link failure recovery request information.

In another optional implementation, the second resource is a dynamic resource, and X≤W≤X·L. In this way, it can be ensured that each cell whose link fails has an opportunity to send the second request information, or it can be ensured that each cell has a same opportunity to recover a link, and the terminal device can be prevented from frequently sending the link failure recovery request information.

Figure 6:
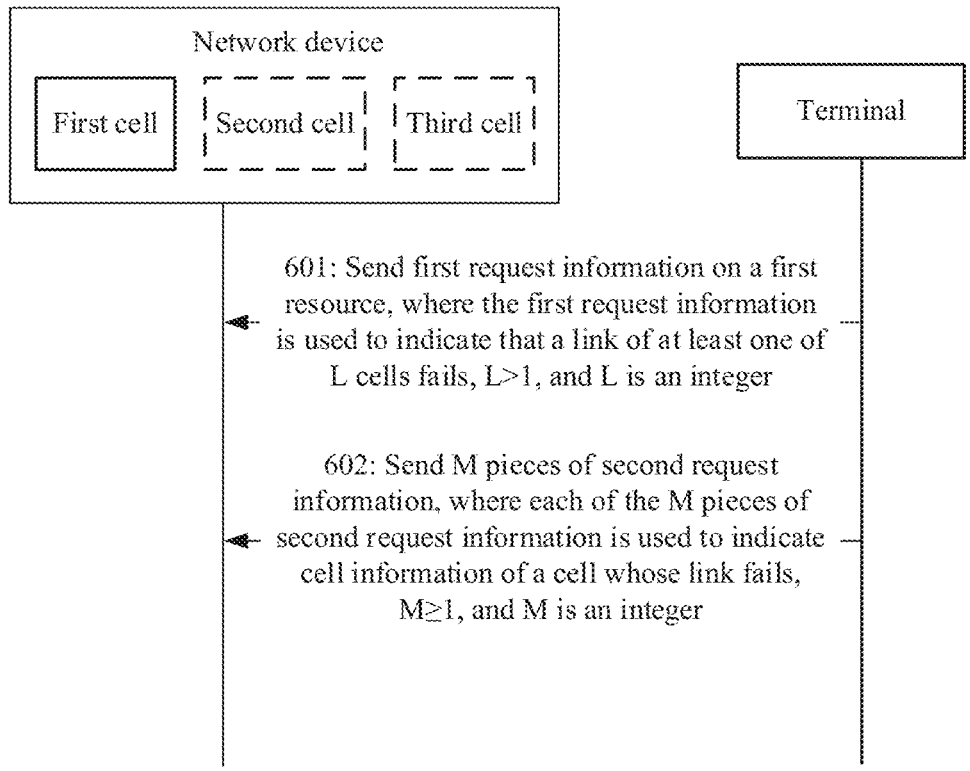
FIG. 6 is a schematic flowchart of a link failure recovery method according to another embodiment of this application.

FIG. 6 is a schematic flowchart of a link failure recovery method according to another embodiment of this application.

It should be noted that, unless otherwise specified, same terms in the embodiments of this application and the embodiments shown in FIG. 3 to FIG. 5 indicate a same meaning.

It should be further noted that the solution in the embodiments of this application can be combined with the solutions in the embodiments shown in FIG. 3 to FIG. 5. To avoid repetition, this is not repeated in this application.

601: A terminal sends first request information on a first resource, where the first request information is used to indicate that a link of at least one of L cells fails, L>1, and L is an integer. Correspondingly, a network device receives the first request information.

Specifically, the terminal may send the first request information to the network device on a same resource (namely, the first resource) when detecting that a link of any one of a plurality of cells fails or links of any more than one of the plurality of cells fail, to notify the network device that the link of at least one of the L cells fails. In this way, in a multi-carrier scenario, compared with resource overheads in a solution in which when a link of each cell fails, one resource is occupied to send one piece of request information, resource overheads are reduced in the embodiments of this application.

602: The terminal sends M pieces of second request information, where each of the M pieces of second request information is used to indicate cell information of a cell whose link fails, M≥1, and M is an integer.

Specifically, each piece of second request information may be used to indicate cell information of one cell whose link fails, or may be used to indicate cell information of a plurality of cells whose links fail. This is not limited in this application. For ease of description, in the following embodiments, without special description, each piece of second request information is used to indicate cell information of one cell whose link fails.

Optionally, the cell information may include a cell identity of the corresponding cell whose link fails and first reference signal information used to recover the corresponding cell whose link fails.

Specifically, one piece of second request information corresponds to a cell identity of one cell whose link fails and first reference signal information used to recover the cell.

Optionally, step 602 may be that the terminal sends the M pieces of second request information based on a priority of a cell corresponding to each of the M pieces of second request information.

Specifically, the M pieces of second request information may be sent in a time sequence based on priorities of cells corresponding to the second request information. For example, the second request information corresponding to a cell having a higher priority is preferentially sent, or the second request information corresponding to a cell having a lower priority is preferentially sent.

Figure 7:
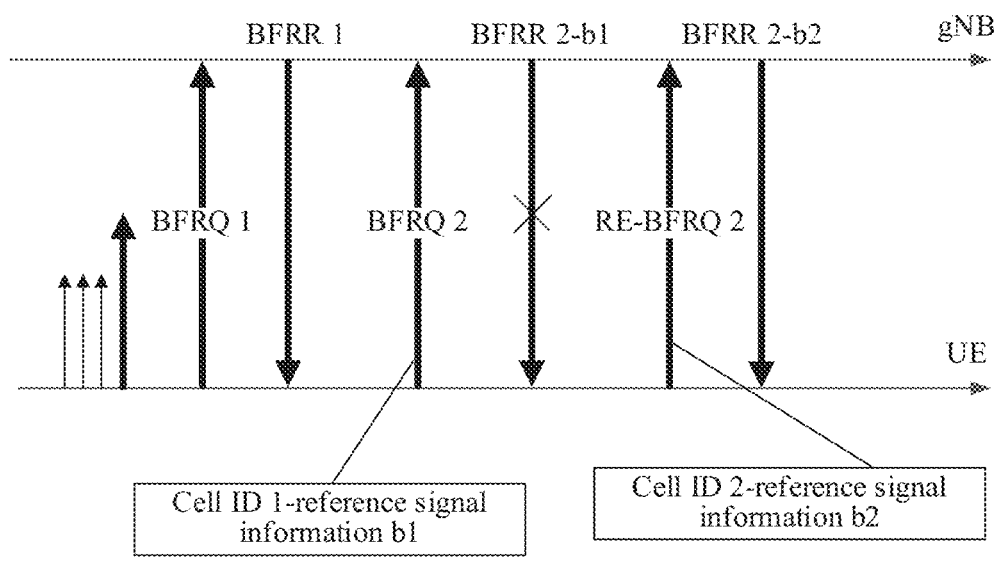
FIG. 7 is a schematic diagram of a link failure recovery method according to another embodiment of this application.

For example, as shown in FIG. 7, a priority of a cell ID 1 is higher than a priority of a cell ID 2. Therefore, second request information corresponding to the cell ID 1 is preferentially transmitted, where the second request information corresponding to the cell ID 1 may further include reference signal information b1 (which may be used to recover a link of the cell ID 1); then second request information corresponding to the cell ID 2 is transmitted, where the second request information corresponding to the cell ID 2 may further include reference signal information b2 (which may be used to recover a link of the cell ID 2).

Optionally, a priority of the cell may be determined based on a sequence of link failures. For example, a priority of a cell whose link fails first is higher than a priority of a cell whose link fails later. Alternatively, a priority of the cell may be determined based on a value of an identity of the cell. For example, a priority of a cell whose identity is smaller is higher than a priority of a cell whose identity is larger. Alternatively, a priority of the cell may be determined depending on whether the cell belongs to a primary cell or a secondary cell. For example, a priority of the primary cell is higher than a priority of the secondary cell. Alternatively, a priority of the cell may be determined based on a bandwidth (an occupied frequency domain resource) of the cell. For example, a priority of a cell occupying a larger bandwidth is higher than a priority of a cell occupying a smaller bandwidth. Alternatively, a priority of the cell may be determined by a quantity of cells that use same QCL information as or satisfy a QCL relationship with the cell. For example, a priority of a cell that uses more same QCL information is higher than a priority of a cell that uses less same QCL information. For example, if QCL information of a PDCCH of a cell 1 is the same as that of two cells, and QCL information of a PDCCH of a cell 2 is the same as that of no cell, a priority of the cell 1 is higher than a priority of the cell 2.

Optionally, the terminal may detect response information of the M pieces of second request information. Third request information is sent when no response information corresponding to an $s^{th}$ piece of second request information in the M pieces of second request information is detected, where the third request information is used to indicate the $s^{th}$ cell and/or second reference signal information used to recover the $s^{th}$ cell, s is a positive integer, and $s \in \{1, 2, \ldots, M\}$.

Specifically, the terminal may detect the response information of the M pieces of second request information. When no response information of any piece of second request information is detected, the terminal may send corresponding third request information to recover a cell.

Optionally, if the second request information is sent on a second resource, the third request information may reuse the second resource, and the third request information is sent on the second resource, thereby reducing resource overheads.

It should be noted that resources occupied by second request information that corresponds to different cells and that are in the M pieces of second request information may be different.

Optionally, when detecting the response information of the $s^{th}$ piece of second request information, the terminal deactivates the second resource.

Specifically, after detecting response information of second request information corresponding to a cell, the terminal may deactivate the second resource for sending the second request information.

Optionally, the terminal resends the first request information on a fourth resource, and receives response information of the resent first request information. The response information of the resent first request information is used to indicate a third resource. The third request information is sent on the third resource.

Optionally, the fourth resource is the same as the first resource.

When detecting a link fault, the terminal sends request information to the network device twice. For example, the first piece of request information is used to notify the network device of a link failure, and the second piece of request information is used to indicate information about a new identified beam and/or indicate an identity of a cell whose link fails. The first piece of request information is periodically sent, and the second piece of request information is aperiodically sent. In this way, compared with resource overheads in a solution in which request information used to indicate both the link failure and the information about the new identified beam is sent once periodically and frequently, resource overheads can be reduced. The first piece of request information may be a beam failure recovery request (beam failure recovery request, BFRQ) 1, BFRQ 1, and the second piece of request information may be a BFRQ 2. If link recovery still fails after a second request, the terminal interrupts transmission of the link. Consequently, signal transmission efficiency is relatively low, and the terminal needs to resend a link failure recovery request to recover the link of the cell.

Optionally, reference signal information that corresponds to the $s^{th}$ cell and that is indicated by the $s^{th}$ piece of second request information in the M pieces of second request information is q pieces of reference signal information, $1 \leq s \leq M$, and k is an integer.

It should be noted that content described in the embodiments of this application and the following embodiments may be the same as that described in the foregoing embodiments shown in FIG. 3 to FIG. 5. To avoid repetition, details are not described herein again. For example, a method for configuring or indicating a resource for sending the second request information and/or the third request information may be the same as that in step 302, a maximum quantity of transmissions of the first request information and/or the cell information may be the same as that in step 302, and a link failure recovery method when the second request information corresponding to the $s^{th}$ cell indicates a plurality of reference signals may be the same as that in step 302.

Optionally, detecting the response information of the second request information includes: detecting, based on a priority sequence of the q pieces of reference signal information, response information of the second request information corresponding to the $s^{th}$ cell.

Optionally, the detecting, based on a priority sequence of the q pieces of reference signal information, the response information of the second request information corresponding to the $s^{th}$ cell includes: detecting the response information of the second request information in a $p'$ time window based on reference signal information whose priority ranks $p^{th}$ and that is in the q pieces of reference signal information indicated by the second request information, where $1 \leq p \leq q$.

Optionally, the method further includes: after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

Optionally, in an implementation, the method further includes: After no response information of the second request information is detected in the $p^{th}$ time window based on the priority ranking $p^{th}$, before the response information of the second request information is detected based on the reference signal information whose priority ranks $(p+1)^{th}$, fifth request information further needs to be sent, where the fifth request information is used to indicate that no response information of the second request information is detected in the $p^{th}$ time window. In this implementation, after receiving the fifth request information, the network device learns that the terminal device detects no response information of the second request information corresponding to a $p^{th}$ reference signal. The network device may then send the response information of the second request information based on a $(p+1)^{th}$ reference signal (correspondingly, the terminal device receives the response information of the second request information corresponding to the $(p+1)^{th}$ reference signal). Otherwise, if the fifth reference signal is not received within a specified time length, the network device may consider that link recovery succeeds. The network device may no longer send response information of the second request information. Optionally, a start location of the $(p+1)^{th}$ time window corresponding to the $(p+1)^{th}$ piece of reference signal information is located in Y time units that are after the fifth request information is sent. Y is greater than or equal to 0.

Optionally, the fifth request information is carried on the second resource.

Optionally, the fifth request information may be carried on the first resource. The fifth request information may have a same format as the first request information.

Optionally, in another implementation, the method further includes: The terminal detects response information of the second request information based on a $p^{th}$ piece of reference signal information. If a response to the second request information is detected, the terminal may further send confirm information to the terminal device. The confirm information is used to indicate that the response information of the second request information corresponding to the $p^{th}$ reference signal is detected, or is used to indicate that the response information of the second request information is detected in the $p^{th}$ time window corresponding to the $p^{th}$ reference signal information. After receiving the confirm information, the network device may deactivate the second resource in time, stop, in time, sending the response information, or learn that link failure recovery succeeds, thereby effectively reducing resource overheads. Optionally, the confirm information may be carried on the second resource, that is, occupies a same resource as the second request information. That is, the confirm information may use a semi-static resource, thereby reducing resource overheads. If no response information of the second request information is detected based on the $p^{th}$ piece of reference signal information, the response information of the second request information is detected (in a second time window) based on the $(p+1)^{th}$ piece of reference signal information (the fifth request information does not need to be sent).

Optionally, sending the M pieces of second request information includes: sending the $s^{th}$ piece of second request information on the second resource; sending the third request information includes: sending the third request information on the second resource.

Figure 8:
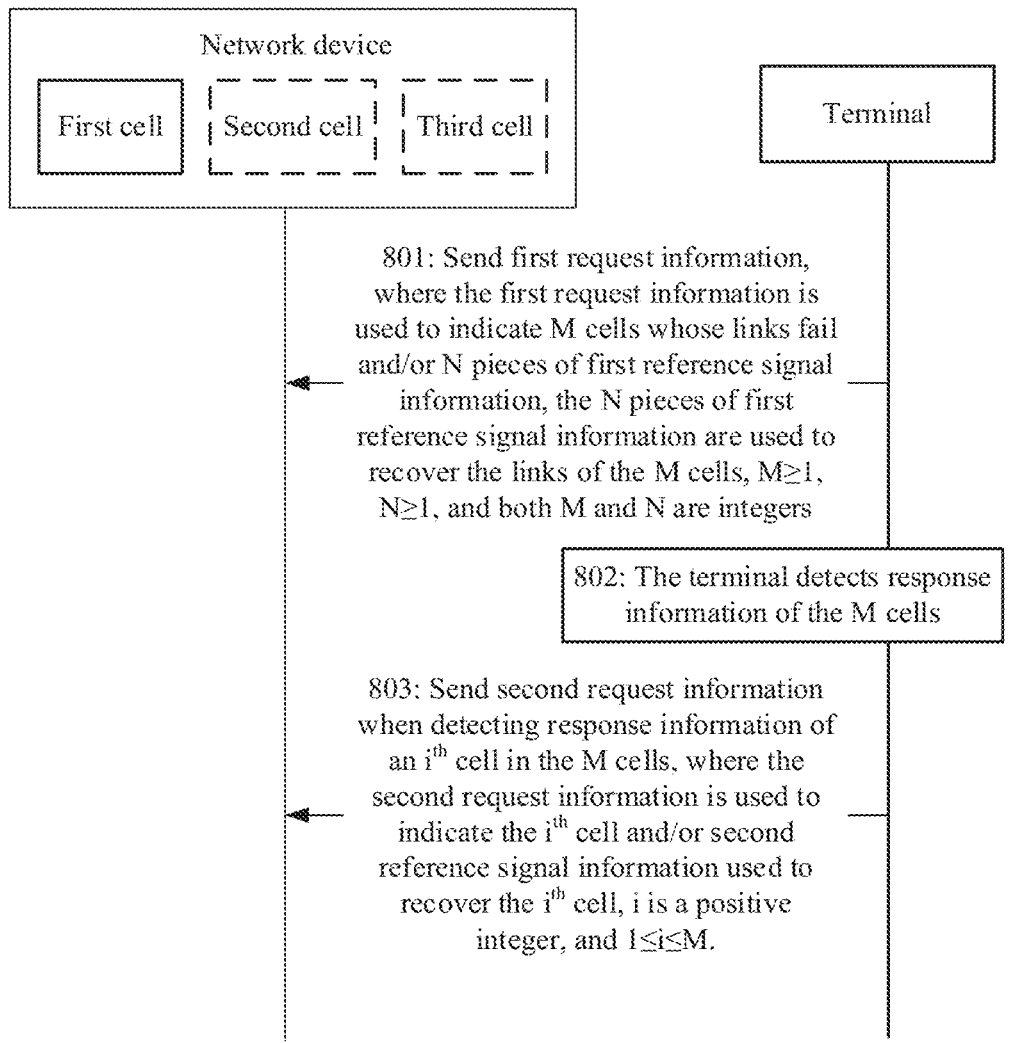
FIG. 8 is a schematic flowchart of a link failure recovery method according to another embodiment of this application.

FIG. 8 is a schematic flowchart of a link failure recovery method according to another embodiment of this application.

801: A terminal sends first request information, where the first request information is used to indicate M cells whose links fail and/or N pieces of first reference signal information, the N pieces of first reference signal information are used to recover the links of the M cells, M≥1, N≥1, and both M and N are integers.

It should be noted that the "first request information" in this application has a same meaning as the "second request information" in the embodiments shown in FIG. 3 to FIG. 6.

802: The terminal detects response information of the M cells.

803: The terminal sends second request information when detecting response information of an $i^{th}$ cell in the M cells, where the second request information is used to indicate the $i^{th}$ cell and/or second reference signal information used to recover the $i^{th}$ cell, i is a positive integer, and 1≤i≤M.

Specifically, after the terminal sends requests twice, if no response information of a cell is detected, the terminal may further initiate a link recovery process again, thereby improving a probability of successful link recovery, and improving signal transmission efficiency.

It should be noted that the "second request information" in this application has a same meaning as the "third request information" in the embodiments shown in FIG. 3 to FIG. 6.

Optionally, when response information of some of the M cells is detected, the second request information may indicate another cell other than those cells in the M cells and/or second reference signal information used to recover the corresponding cell.

Optionally, the second request information may further indicate those cells that receive the response information and/or confirm information of the corresponding cells.

Optionally, in step 801, the terminal may send the first request information on a first resource. The first resource may be a grant-free PUSCH resource, or the first resource is a PUCCH resource.

Figure 9:
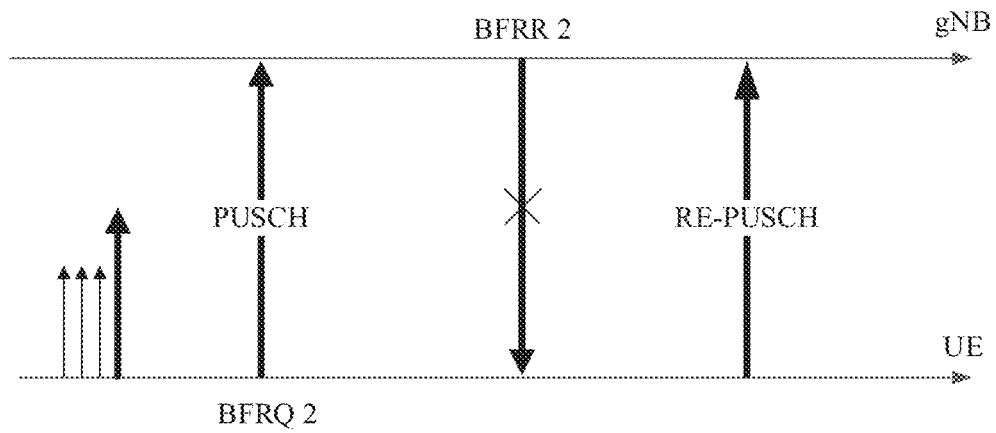
FIG. 9 is a schematic diagram of a link failure recovery method according to an embodiment of this application.

Specifically, a PUCCH may be a resource used for sending link failure recovery request information, or a configured PUCCH resource used for other functions (for example, transmitting information such as an L1-reference signal received power (reference signal receiving power, RSRP) and an L1-signal to interference plus noise ratio (signal to interference plus noise ratio, SINR) and transmitting information such as a CQI PMI) is reused for the PUCCH. For example, as shown in FIG. 9, the first resource is a PUSCH.

It should be noted that the first resource may have a same meaning as the second resource in the embodiments shown in FIG. 3 to FIG. 6.

Optionally, the terminal may further receive higher layer signaling, where the higher layer signaling is used to indicate the first resource.

Optionally, a quantity of transmissions of request information used to indicate at least one of the M cells whose links fail and/or at least one of the N pieces of reference signal information is less than or equal to a preset quantity threshold or a quantity threshold configured by a network device.

Specifically, the first request information in step 801 may be repeatedly sent. For example, the second request information is the repeatedly sent first request information, and both are used to request to recover a link. However, a cell requested each time to be recovered may be different from one other (for example, a cell requested for the second time to be recovered is a subset of a cell requested for the first time to be recovered) and/or reference signals used to recover a link of a cell may be different. In other words, a quantity of times of repeatedly sending the first request information needs to be less than or equal to a preset value X. The preset value may be a quantity threshold preset by the terminal or a quantity threshold configured by the network device.

Optionally, before sending the first request information, the method further includes: determining that a link of at least one of L cells fails; or determining that the link of at least one of the L cells fails and a reference signal used to recover the link of the at least one cell.

It should be noted that content described in this application may be the same as that described in the embodiment shown in FIG. 5. To avoid repetition, details are not described herein again. For example, a link failure recovery method when second request information corresponding to a $k^{th}$ cell indicates a plurality of reference signals may be the same as that in step 302.

Optionally, reference signal information that is in the second request information and that corresponds to the $k^{th}$ cell in the M cells whose links fail and that is indicated by the second request information is q pieces of reference signal information, 1≤k≤M, 1<q<N, and both k and q are integers.

Optionally, detecting the response information of the M cells includes: detecting, based on a priority sequence of the q pieces of reference signal information, response information corresponding to the $k^{th}$ cell.

Optionally, the detecting, based on a priority sequence of the q pieces of reference signal information, response information corresponding to the $k^{th}$ cell includes: detecting, in a $p^{th}$ time window based on reference signal information whose priority ranks $p^{th}$ and that is in the q pieces of reference signal information, the response information corresponding to the $k^{th}$ cell, where $1 \leq p \leq q$.

Optionally, the method further includes: after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

Optionally, in an implementation, the method further includes: After no response information of the second request information is detected in the $p^{th}$ time window based on the priority ranking $p'$, before the response information of the second request information is detected based on the reference signal information whose priority ranks $(p+1)^{th}$, fifth request information further needs to be sent, where the fifth request information is used to indicate that no response information of the second request information is detected in the $p^{th}$ time window. In this implementation, after receiving the fifth request information, the network device learns that the terminal device detects no response information of the second request information corresponding to the $p^{th}$ reference signal. The network device may then send the response information of the second request information based on a $(p+1)^{th}$ reference signal (correspondingly, the terminal device receives the response information of the second request information corresponding to the $(p+1)^{th}$ reference signal). Otherwise, if the fifth reference signal is not received within a specified time length, the network device may consider that link recovery succeeds. The network device may no longer send response information of the second request information. Optionally, a start location of the $(p+1)^{th}$ time window corresponding to the $(p+1)^{th}$ piece of reference signal information is located in Y time units that are after the fifth request information is sent. Y is greater than or equal to 0.

Optionally, the fifth request information is carried on a second resource.

Optionally, the fifth request information may be carried on the first resource. The fifth request information may have a same format as the first request information.

Optionally, in another implementation, the method further includes: The terminal detects response information of the second request information based on a $p^{th}$ piece of reference signal information. If a response to the second request information is detected, the terminal may further send confirm information to the terminal device. The confirm information is used to indicate that the response information of the second request information corresponding to the $p^{th}$ reference signal is detected, or is used to indicate that the response information of the second request information is detected in the $p^{th}$ time window corresponding to the $p^{th}$ reference signal information. After receiving the confirm information, the network device may deactivate the second resource in time, stop, in time, sending the response information, or learn that link failure recovery succeeds, thereby effectively reducing resource overheads. Optionally, the confirm information may be carried on the second resource, that is, occupies a same resource as the second request information. That is, the confirm information may use a semi-static resource, thereby reducing resource overheads. If no response information of the second request information is detected based on the $p^{th}$ piece of reference signal information, the response information of the second request information is detected (in a second time window) based on the $(p+1)^{th}$ piece of reference signal information (the fifth request information does not need to be sent).

It should be noted that in this application (including the embodiments shown in FIG. 3 to FIG. 7), sending or detecting response information of the first/second/third request information based on a reference signal may be understood as that the reference signal and the response information satisfy a QCL relationship, or may be understood as sending or receiving the response information based on a beam corresponding to the reference signal. Response information of the second request information corresponding to a reference signal may also be understood as that the reference signal and the response information satisfy a QCL relationship, or may be understood as sending or receiving the response information based on a beam corresponding to the reference signal. For example, detecting response information of the second request information based on the $p^{th}$ piece of reference signal information may be understood as that the $p^{th}$ reference signal and the response information satisfy a QCL relationship, or may be understood as that the terminal device receives the response information of the second request information by using a receive beam or a spatial relation parameter used when the $p^{th}$ reference signal is received.

It should be noted that in this application (including the embodiments shown in FIG. 3 to FIG. 7), the "cell identity" may alternatively be replaced with a "cell index". Reference signal information may include a reference signal index/an index of an SSB and/or reference signal quality/quality of the SSB.

It should be noted that in this application (including the embodiments shown in FIG. 3 to FIG. 7), the first reference signal or the second reference signal may be a reference signal in a candidate reference signal resource set used for link recovery, may be a reference signal in a reference signal resource set used for beam training, may be a reference signal in another reference signal resource set, or may be an SSB in an SSB resource set. The reference signal may be a CSI-RS, may be an SSB, or may be a TRS. Optionally, channel quality of the reference signal is greater than a preset threshold.

It should be noted that in this application (including the embodiments shown in FIG. 3 to FIG. 7), a cell whose link fails may be the same as or different from a cell in which a resource carrying the first/second/third request information is located. For example, the M cells whose links fail are SCells, and the cell in which the resource carrying the first/second/third request information is located may be a PCell or an SCell having an uplink resource. A cell in which a resource carrying the first request information resource is located may be the same as or different from a cell in which a resource carrying the second request information resource is located. The cell in which the resource carrying the second request information resource is located may be the same as or different from a cell in which a resource carrying the third request information resource is located. The cell in which the resource carrying the first/second/third request information is located may be the same as or different from a cell in which a resource carrying response information is located.

It should be understood that, in this application, the response information of the M cells may be understood as that each cell corresponds to one piece of response information, and there are M pieces of response information in total. It may be further understood as that the response information of the M cells corresponds to one piece of response information or a plurality of pieces of response information in total.

Figure 10:
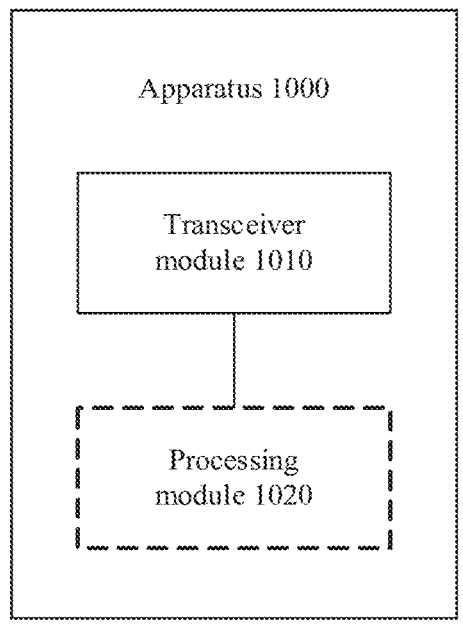
FIG. 10 is a schematic block diagram of a link failure recovery apparatus according to an embodiment of this application.

FIG. 10 is a schematic block diagram of a link failure recovery apparatus 1000 according to an embodiment of this application.

It should be understood that the apparatus 1000 may correspond to the terminal in the embodiment shown in FIG. 4, and may have any function of the terminal in the method. The apparatus 1000 includes a transceiver module 1010.

The transceiver module 1010 is configured to send first request information on a first resource, where the first request information is used to indicate that a link of at least one of L cells fails, and L is an integer greater than 1.

The transceiver module 1010 is configured to send second request information on a second resource, where the second request information is used to indicate cell information of M cells whose links fail and that are in the L cells, M≥1, and M is an integer.

Optionally, the cell information of the M cells includes cell identities of the M cells and/or N pieces of first reference signal information used to recover the M cells, N≥1, and N is an integer.

Optionally, the apparatus 1000 further includes:
  a processing module 1020, configured to detect response information of the M cells.

The transceiver module 1010 is further configured to send third request information, where when no response information of an $i^{th}$ cell in the M cells is detected, the third request information indicates a cell identity of the $i^{th}$ cell and/or second reference signal information used to recover the $i^{th}$ cell, i is a positive integer, and 1≤i≤M; and when response information of a $j^{th}$ cell in the M cells is detected, the third request information further indicates confirm information of the $j^{th}$ cell, j is a positive integer, 1≤j≤M, and i is not equal to j; or
  the transceiver module 1010 is further configured to send the third request information, where when no response information of the $i^{th}$ cell in the M cells is detected, the third request information indicates the cell identity of the $i^{th}$ cell and/or the second reference signal information used to recover the $i^{th}$ cell, i is a positive integer, and 1≤i≤M; or when the response information of the $j^{th}$ cell in the M cells is detected, the third request information is used to indicate the confirm information of the $j^{th}$ cell, j is a positive integer, 1≤j≤M, and i=j.

Optionally, cell information of a $k^{th}$ cell in the M cells includes q pieces of first reference signal information, k is a positive integer, and 1<q≤N.

Optionally, the processing module 1020 is configured to detect, based on a priority sequence of the q pieces of reference signal information, response information corresponding to the kth cell.

Optionally, the processing module 1020 is configured to detect, in a $p^{th}$ time window based on reference signal information whose priority ranks $p^{th}$ and that is in the q pieces of reference signal information, the response information corresponding to the $k^{th}$ cell, where 1≤p≤q.

Optionally, the processing module 1020 is further configured to: after no response information of the second request information is detected in the $p^{th}$ time window based on the priority ranking $p^{th}$, detect the response information of the second request information in a $(p+1)^{th}$ time window based on reference signal information whose priority ranks $(p+1)^{th}$ and that is in the q pieces of reference signal information, where the $(p+1)^{th}$ time window is a time period later than the $p^{th}$ time window.

Optionally, the transceiver module 1010 is configured to send the third request information on the second resource.

Optionally, the processing module 1020 is further configured to deactivate the second resource when the response information of the M cells is detected.

Optionally, when no response information of at least one of the M cells is detected, the transceiver module is further configured to resend the first request information on a fourth resource; the transceiver module is further configured to receive response information of the resent first request information, where the response information of the resent first request information is used to indicate a third resource; and the transceiver module 1010 configured to send the third request information on the third resource.

Optionally, the fourth resource is the same as the first resource.

Optionally, W≤X·L, W is a maximum value of a quantity of transmissions of the first request information, and X is a maximum value of a quantity of transmissions of request information used to indicate cell information of any one of the M cells.

Optionally, the transceiver module 1010 is further configured to receive response information of the first request information, where the response information of the first request information is used to indicate or activate the second resource.

Optionally, the second resource is configured by using higher layer signaling, or the second resource is a resource associated with the first resource or the first request information.

Optionally, before the first request information is sent on the first resource, the processing module 1020 is further configured to determine that the link of at least one of the L cells fails; or
  the processing module 1020 is further configured to determine that the link of at least one of the L cells fails and reference signal information used to recover the link of the at least one cell.

Figure 11:
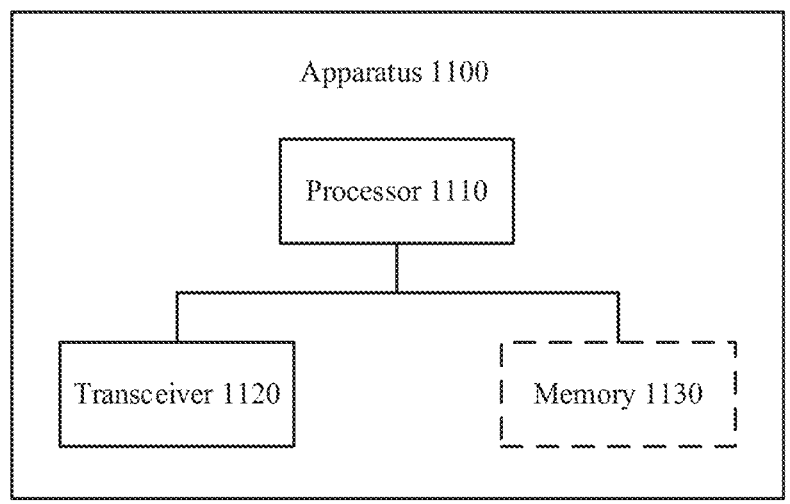
FIG. 11 is a schematic structural diagram of a link failure recovery apparatus according to an embodiment of this application.

FIG. 11 shows a link failure recovery apparatus 1100 according to an embodiment of this application. The apparatus 1100 may be the terminal in FIG. 4. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other by using an internal connection path. A related function implemented by the processing module 1020 in FIG. 10 may be implemented by the processor 1110, and a related function implemented by the transceiver module 1010 may be implemented by the processor 1110 controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may refer to one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the link failure recovery apparatus (for example, a base station, a terminal, or a chip), execute a software program, and process data of the software program.

Optionally, the processor 1110 may include one or more processors, for example, include one or more central processing units (central processing unit, CPU). When the processor is one CPU, the CPU may be a single-core CPU, or may be a multi-core CPU.

The transceiver 1120 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 1130 includes but is not limited to a random access memory (RAM), a read-only memory (ROM), an erasable programmable read-only memory (EPROM), and a compact disc read-only memory (CD-ROM). The memory 1130 is configured to store related instructions and data.

The memory 1130 is configured to store program code and data of the terminal, and may be a separate device or integrated into the processor 1110.

Specifically, the processor 1110 is configured to control the transceiver to perform information transmission with the terminal. For details, refer to the description in the method embodiment. Details are not described herein again.

In an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, a projector, or the like. The input device communicates with the processor 1110, and may receive an input from a user in a plurality of manners. For example, the input device may be a mouse, a keyboard, a touchscreen device, a sensing device, or the like.

It may be understood that FIG. 11 shows only a simplified design of the link failure recovery apparatus. During actual application, the apparatus may further separately include other necessary components, including but not limited to any quantity of transceivers, processors, controllers, memories, and the like, and all terminals that can implement this application shall fall within the protection scope of this application.

In a possible design, the apparatus 1100 may be a chip, for example, may be a communication chip that can be used in the terminal, and configured to implement a related function of the processor 1110 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal, or may be a circuit. The apparatus may be configured to perform an action performed by the terminal in the foregoing method embodiments.

Figure 12:
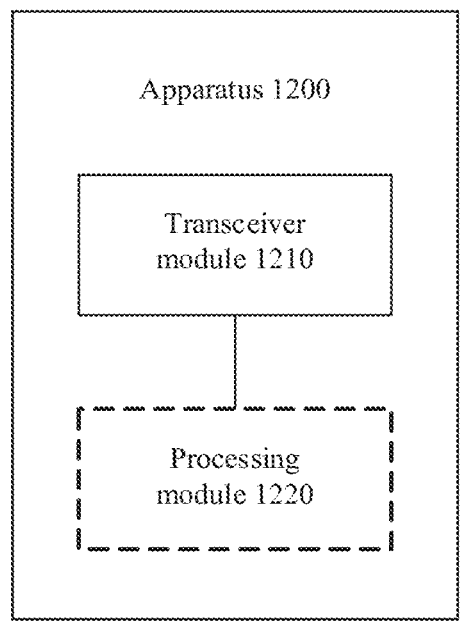
FIG. 12 is a schematic block diagram of a link failure recovery apparatus according to another embodiment of this application.

FIG. 12 is a schematic block diagram of a link failure recovery apparatus 1200 according to an embodiment of this application.

It should be understood that the apparatus 1200 may correspond to the network device in the embodiment shown in FIG. 4, and may have any function of the network device in the method. The apparatus 1200 includes a transceiver module 1210.

The transceiver module 1210 is configured to receive first request information on a first resource, where the first request information is used to indicate that a link of at least one of L cells fails, and L is an integer greater than 1.

The transceiver module 1210 is configured to receive second request information on a second resource, where the second request information is used to indicate cell information of M cells whose links fail and that are in the L cells, $M \geq 1$, and M is an integer.

Optionally, the cell information of the M cells includes cell identities of the M cells and/or N pieces of first reference signal information used to recover the M cells, $N \geq 1$, and N is an integer.

Optionally, the transceiver module 1210 is further configured to:

send response information of a $j^{th}$ cell, and receiving third request information, where the third request information is used to indicate a cell identity of an $i^{th}$ cell and/or second reference signal information used to recover the $i^{th}$ cell and confirm information of the $j^{th}$ cell, $1 \leq i \leq M$, $1 \leq j \leq M$, i is not equal to j, and both i and j are positive integers;

receive the third request information, where the third request information is used to indicate the cell identity of the $i^{th}$ cell and/or the second reference signal information used to recover the $i^{th}$ cell, i is a positive integer, and $1 \leq i \leq M$; or send the response information of the $j^{th}$ cell, and receiving the third request information, where the third request information is used to indicate the confirm information of the $j^{th}$ cell, j is a positive integer, and $1 \leq j \leq M$.

Optionally, the transceiver module 1210 is configured to receive the third request information on the second resource.

Optionally, the transceiver module 1210 is further configured to:

receive the first request information on a fourth resource; and send response information of the first request information, where the response information of the first request information is used to indicate a third resource.

The transceiver module 1210 is configured to:

receive the third request information on the third resource.

Optionally, the fourth resource is the same as the first resource.

Optionally, before receiving the second request information on the second resource, the transceiver module is further configured to send the response information of the first request information, where the response information is used to indicate or activate the second resource.

Optionally, before receiving the second request information on the second resource, the transceiver module is further configured to send higher layer signaling, where the higher layer signaling is used to configure the second resource.

Optionally, the second resource is a resource associated with the first resource or the first request information.

Optionally, the transceiver module 1210 is further configured to send configuration information, where the configuration information is used to configure the first resource.

Figure 13:
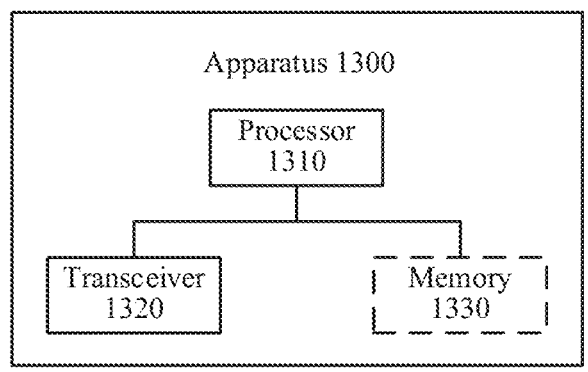
FIG. 13 is a schematic structural diagram of a link failure recovery apparatus according to another embodiment of this application.

FIG. 13 shows a link failure recovery apparatus 1300 according to an embodiment of this application. The apparatus 1300 may be the terminal in FIG. 4. The apparatus may use a hardware architecture shown in FIG. 13. The apparatus may include a processor 1310 and a transceiver 1320. Optionally, the apparatus may further include a memory 1330. The processor 1310, the transceiver 1320, and the memory 1330 communicate with each other by using an internal connection path. A related function implemented by the processing module 1320 in FIG. 13 may be implemented by the processor 1310, and a related function implemented by the transceiver module 1310 may be implemented by the processor 1310 controlling the transceiver 1320.

Optionally, the processor 1310 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may refer to one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the link failure recovery apparatus (for example, a base station, a terminal, or a chip), execute a software program, and process data of the software program.

Optionally, the processor 1310 may include one or more processors, for example, include one or more central processing units (CPU). When the processor is one CPU, the CPU may be a single-core CPU, or may be a multi-core CPU.

The transceiver 1320 is configured to send and receive data and/or a signal, and receive data and/or a signal. The transceiver may include a transmitter and a receiver. The transmitter is configured to send the data and/or the signal, and the receiver is configured to receive the data and/or the signal.

The memory 1330 includes but is not limited to a random access memory (RAM), a read-only memory (ROM), an erasable programmable memory (EPROM), and a compact disc read-only memory (CD-ROM). The memory 1330 is configured to store related instructions and data.

The memory 1330 is configured to store program code and data of the terminal, and may be a separate device or integrated into the processor 1310.

Specifically, the processor 1310 is configured to control the transceiver to perform information transmission with the terminal. For details, refer to the description in the method embodiment. Details are not described herein again.

During specific implementation, in an embodiment, the apparatus 1300 may further include an output device and an input device. The output device communicates with the processor 1310, and may display information in a plurality of manners. For example, the output device may be a liquid crystal display (LCD), a light emitting diode (LED) display device, a cathode ray tube (CRT) display device, a projector (projector), or the like. The input device communicates with the processor 601, and may receive an input from a user in a plurality of manners. For example, the input device may be a mouse, a keyboard, a touchscreen device, a sensing device, or the like.

It may be understood that FIG. 13 shows only a simplified design of the link failure recovery apparatus. During actual application, the apparatus may further separately include other necessary components, including but not limited to any quantity of transceivers, processors, controllers, memories, and the like, and all terminals that can implement this application shall fall within the protection scope of this application.

In a possible design, the apparatus 1300 may be a chip, for example, may be a communication chip that can be used in the terminal, and configured to implement a related function of the processor 1310 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal, or may be a circuit. The apparatus may be configured to perform an action performed by the terminal in the foregoing method embodiments.

Figure 14:
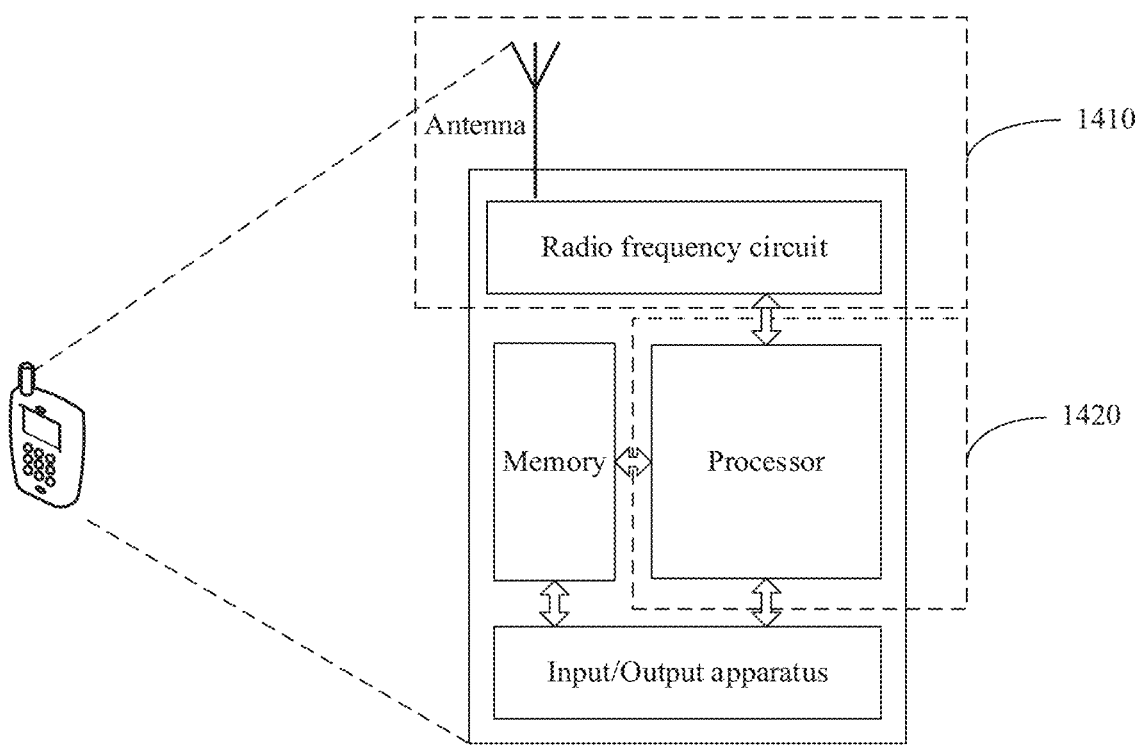
FIG. 14 is a schematic diagram of a link failure recovery apparatus according to an embodiment of this application.

Optionally, when the apparatus in this embodiment is a terminal, FIG. 14 is a schematic structural diagram of a simplified terminal. For ease of understanding and illustration, in FIG. 14, an example in which the terminal is a mobile phone is used. As shown in FIG. 14, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send/receive a radio frequency signal in a form of an electromagnetic wave. The input/output apparatus such as a touchscreen, a display, or a keyboard is mainly configured to receive data entered by a user and output data to the user. It should be noted that some types of terminals may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this application.

In some embodiments of this application, the antenna and the radio frequency circuit that have sending and receiving functions may be considered as a transceiver unit of the terminal, and the processor that has a processing function may be considered as a processing unit of the terminal. As shown in FIG. 14, the terminal includes the transceiver unit 1410 and the processing unit 1420. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may also be sometimes referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

It should be understood that the transceiver unit 1410 is configured to perform the sending operation and the receiving operation on a terminal side in the foregoing method embodiments, and the processing unit 1420 is configured to perform another operation other than the sending operation and the receiving operation of the terminal in the foregoing method embodiments.

For example, in an implementation, the processing unit 1420 is configured to perform the processing steps on the terminal side in FIG. 3. The transceiver unit 1410 is configured to perform the sending operation and the receiving operation in step 301 and/or step 302 in FIG. 3, and/or the transceiver unit 1410 is further configured to perform other sending and receiving steps on the terminal side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 15:
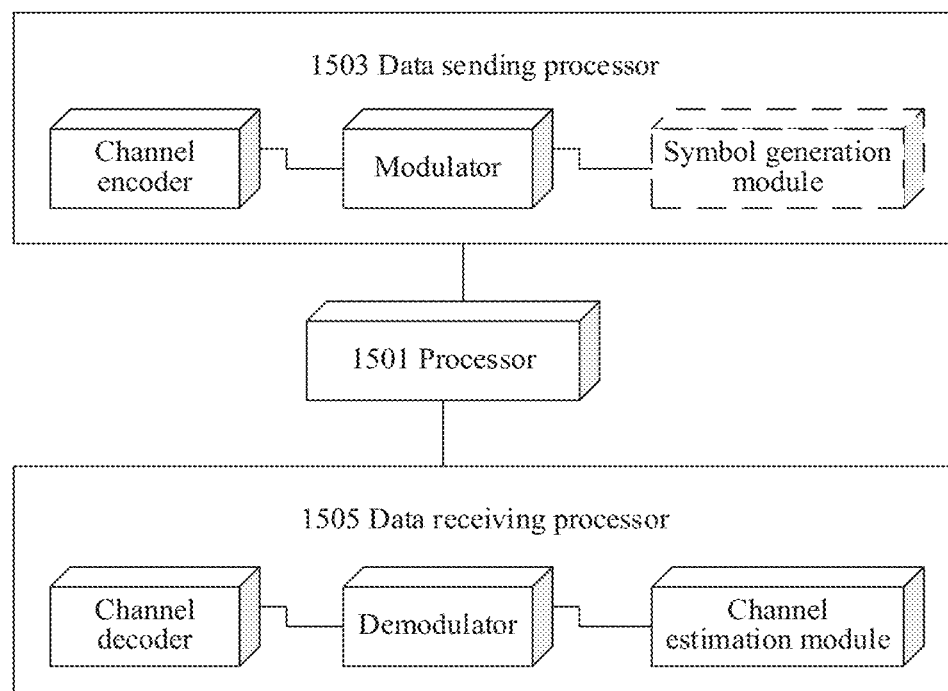
FIG. 15 is a schematic diagram of a link failure recovery apparatus according to another embodiment of this application.

Optionally, when the apparatus is a terminal, further refer to a device shown in FIG. 15. In an example, the device may complete a function similar to that of the processor unit 1420 in FIG. 14. In FIG. 15, the device includes a processor 1501, a data sending processor 1503, and a data receiving processor 1505. The processing module 1020 in the foregoing embodiment may be the processor 1501 in FIG. 15, and completes a corresponding function. The transceiver module 1010 in the foregoing embodiment may be the data sending processor 1503 and the data receiving processor 1505 in FIG. 15. Although FIG. 15 shows a channel encoder and a channel decoder, it may be understood that the modules are merely examples, and do not constitute a limitation on this embodiment.

Figure 16:
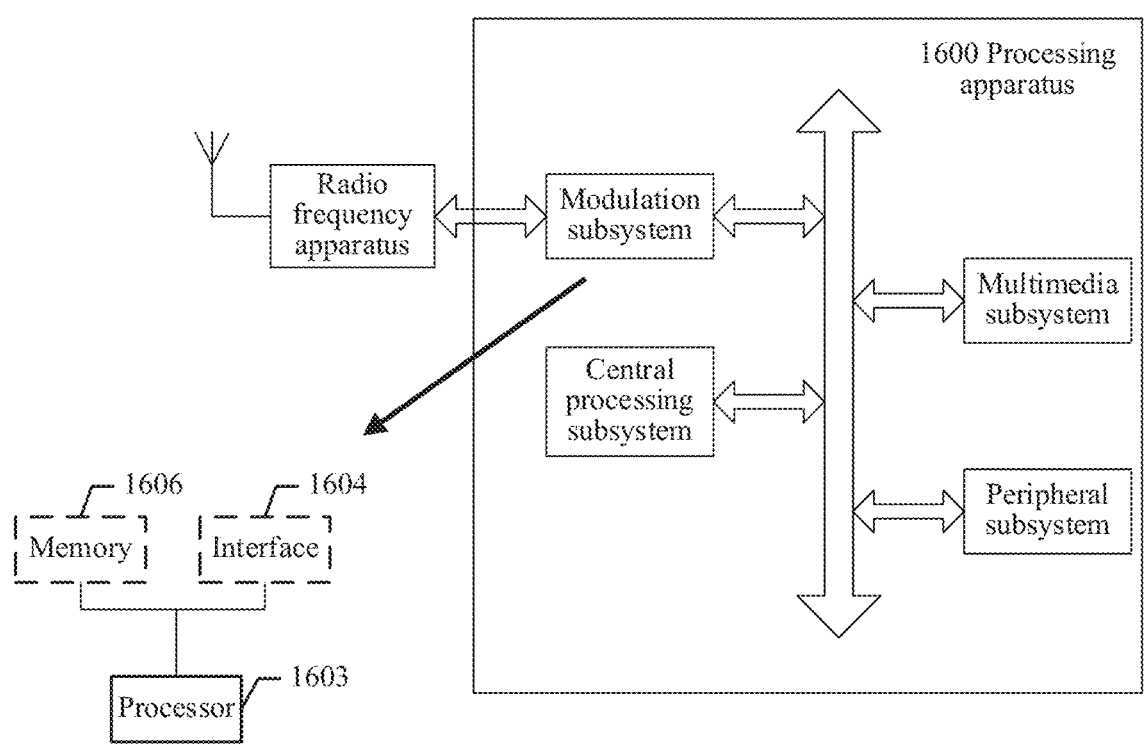
FIG. 16 is a schematic diagram of a link failure recovery apparatus according to another embodiment of this application.

FIG. 16 shows another form of this embodiment. A processing apparatus 1600 includes modules such as a modulation subsystem, a central processing subsystem, and a peripheral subsystem. A communication device in this embodiment may be used as the modulation subsystem in the processing apparatus 1600. Specifically, the modulation subsystem may include a processor 1603 and an interface 1604. The processor 1603 implements a function of the processing module 1020, and the interface 1604 implements a function of the transceiver module 1010. In another variant, the modulation subsystem includes a memory 1606, a processor 1603, and a program that is stored in the memory and that can be run on the processor. When executing the program, the processor implements the method according to one of the embodiments 1 to 5. It should be noted that the memory 1606 may be nonvolatile or volatile. The memory 1606 may be located in the modulation subsystem, or may be located in the processing apparatus 1600, provided that the memory 1606 can be connected to the processor 1603.

Figure 17:
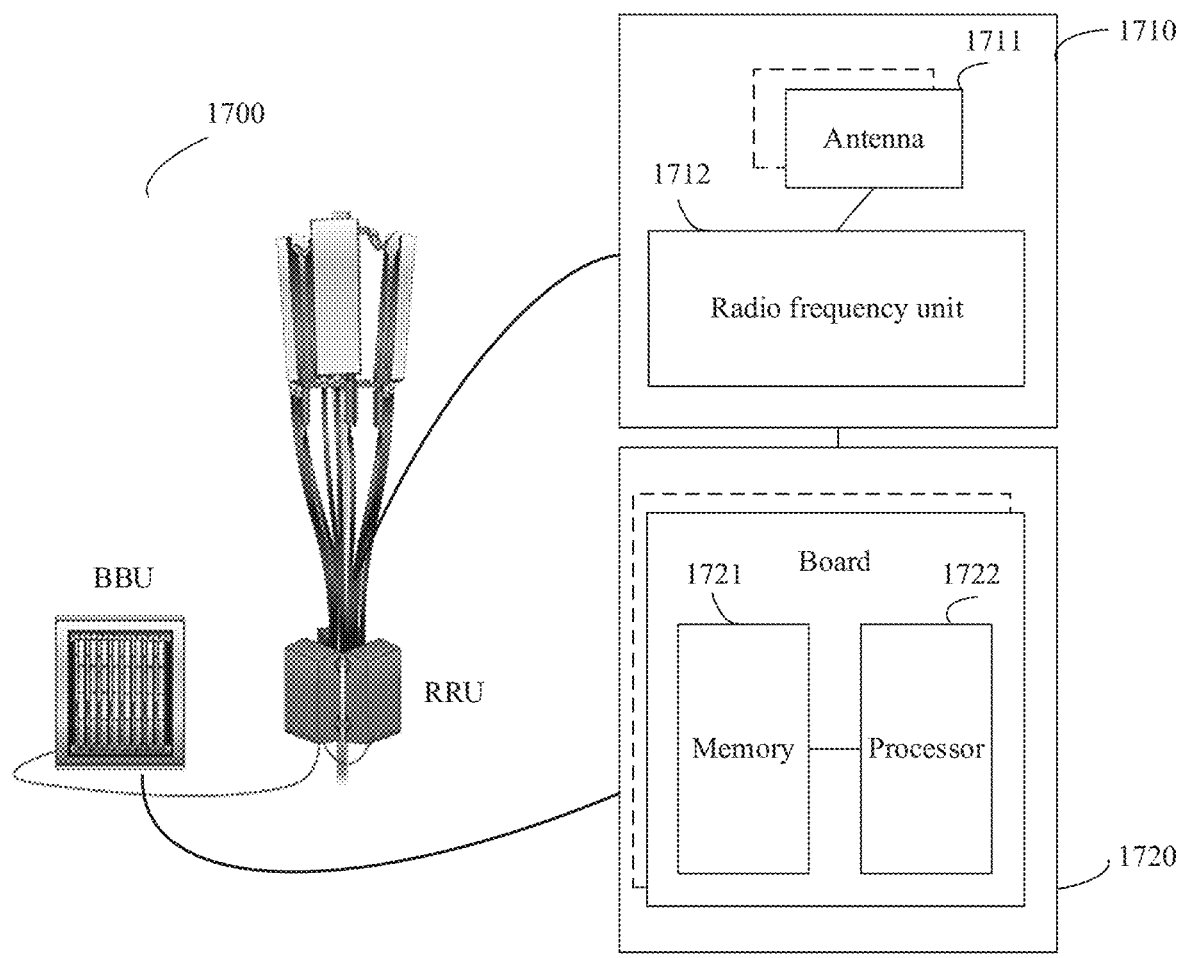
FIG. 17 is a schematic diagram of a link failure recovery apparatus according to another embodiment of this application.

When the apparatus in this embodiment is a network device, the network device may be shown in FIG. 17. An apparatus 1700 includes one or more radio frequency units, such as a remote radio unit (RRU) 1710 and one or more baseband units (BBU) (which may also be referred to as a digital unit (DU)) 1720. The RRU 1710 may be referred to as a transceiver module, and corresponds to the transceiver module 1010 in FIG. 10. Optionally, the transceiver module may also be referred to as a transceiver, a transceiver circuit, a transceiver, or the like, and may include at least one antenna 1711 and a radio frequency unit 1712. The RRU 1710 is mainly configured to send and receive a radio frequency signal, and perform conversion between the radio frequency signal and a baseband signal. For example, the RRU 1710 is configured to send indication information to a terminal device. The BBU 1720 is mainly configured to: perform baseband processing, control a base station, and so on. The RRU 1710 and the BBU 1720 may be physically disposed together, or may be physically disposed separately; to be specific, the base station is a distributed base station.

The BBU 1720 is a control center of the base station, or may be referred to as a processing module. The BBU 1720 may correspond to a processing module 1220 in FIG. 12, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1720 may include one or more boards, and a plurality of boards may jointly support a radio access network (such as an LTE network) having a single access standard, or may separately support radio access networks (such as an LTE network, a 5G network, or another network) having different access standards. The BBU 1720 further includes a memory 1721 and a processor 1722. The memory 1721 is configured to store necessary instructions and data. The processor 1722 is configured to control the base station to perform a necessary action, for example, configured to control the base station to perform the operation procedure related to the network device in the foregoing method embodiments. The memory 1721 and the processor 1722 may serve one or more boards. In other words, a memory and a processor may be separately disposed on each board. Alternatively, a plurality of boards may share a same memory and a same processor. In addition, a necessary circuit may be further disposed on each board.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, the processor may be an integrated circuit chip, and has a signal processing capability. In an implementation process, steps in the foregoing method embodiment can be completed by using a hardware integrated logic circuit in the processor, or by using instructions in a form of software. The foregoing processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the method, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (random access memory, RAM) that is used as an external cache. According to a description that is used as an example instead of a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchronous link DRAM, SLDRAM), and a direct rambus random access memory (direct rambus RAM, DR RAM).

In this application, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present invention. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

It should be further understood that "first", "second", and various numerical symbols in this specification are merely used for distinguishing for ease of description, and are not used to limit a scope of the embodiments of this application.

It should be understood that the term "and/or" in this specification describes only an association relationship between associated objects and represents that three relationships may exist. For example, A and/or B may represent the following three cases: Only A exists, both A and B exist, and only B exists. When only A or only B exists, a quantity of As or Bs is not limited. In an example in which only A exists, it may be understood as that there is one or more As.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A link failure recovery method, comprising: sending first request information on a first resource, wherein the first request information indicates that a link of at least two of L cells fail, and L is an integer greater than 1; and sending second request information on a second resource, wherein the second request information indicates cell information of M cells whose links fail and that are in the L cells, $M≥2$, and M is an integer; wherein the cell information of the M cells comprises cell identities of the M cells or N pieces of first reference signal information used to recover the M cells, $N≥2$, and N is an integer; wherein the method further comprises: detecting response information of the M cells; and sending third request information, wherein when no response information of an ith cell in the M cells is detected, the third request information indicates a cell identity of the ith cell or second reference signal information used to recover the ith cell, i is a positive integer, and $1≤i≤M$; and when response information of a jth cell in the M cells is detected, the third request information further indicates confirm information of the jth cell, j is a positive integer, $1≤i≤M$, and i is not equal to j: or sending the third request information, wherein when no response information of the ith cell in the M cells is detected, the third request information indicates the cell identity of the ith cell or the second reference signal information used to recover the ith cell, i is a positive integer, and $1≤i≤M$; or when the response information of the jth cell in the M cells is detected, the third request information is used to indicate the confirm information of the jth cell, j is a positive integer, $1≤j≤M$, and i=j.

2. The method according to claim 1, wherein cell information of a kth cell in the M cells comprises q pieces of first reference signal information, k is a positive integer, and $1<q≤N$.

3. The method according to claim 2, wherein the detecting response information of the M cells comprises:
   detecting, based on a priority sequence of the q pieces of reference signal information, response information corresponding to the $k^{th}$ cell.

4. The method according to claim 3, wherein the detecting, based on a priority sequence of the q pieces of reference signal information, response information corresponding to the $k^{th}$ cell comprises:
   detecting, in a $p^{th}$ time window based on reference signal information whose priority ranks $p^{th}$ and that is in the q pieces of reference signal information, the response information corresponding to the $k^{th}$ cell, wherein $1≤p≤q$.

5. The method according to claim 4, wherein the method further comprises:
   after no response information of the second request information is detected in the $p^{th}$ time window based on the priority ranking $p^{th}$, detecting the response information of the second request information in a $(p+1)^{th}$ time window based on reference signal information whose priority ranks $(p+1)^{th}$ and that is in the q pieces of reference signal information, wherein the $(p+1)^{th}$ time window is a time period later than the $p^{th}$ time window.

6. The method according to claim 1, wherein the sending third request information comprises: sending the third request information on the second resource.

7. The method according to claim 1, wherein the method further comprises:
   deactivating the second resource when the response information of the M cells is detected.

8. The method according to claim 1, wherein when no response information of at least one of the M cells is detected, the method further comprises: resending the first request information on a fourth resource; and receiving response information of the resent first request information, wherein the response information of the resent first request information indicates a third resource; and the sending third request information comprises: sending the third request information on the third resource.

9. A link failure recovery apparatus, comprising: a transceiver, configured to send first request information on a first resource, wherein the first request information indicates that a link of at least two of L cells fails, and L is an integer greater than 1, wherein the transceiver is further configured to send second request information on a second resource, wherein the second request information indicates cell information of M cells whose links fail and that are in the L cells, M≥2, and M is an integer;

wherein the cell information of the M cells comprises cell identities of the M cells or N pieces of first reference signal information used to recover the M cells, N≥2, and N is an integer; wherein the apparatus further comprises a processor configured to detect response information of the M cells; and wherein the transceiver is further configured to send third request information, wherein when no response information of an ith cell in the M cells is detected, the third request information indicates a cell identity of the ith cell or second reference signal information used to recover the ith cell, i is a positive integer, and 1≤i≤M; and when response information of a jth cell in the M cells is detected, the third request information further indicates confirm information of the jth cell, j is a positive integer, 1≤j≤M, and i is not equal to j; or the transceiver is further configured to send the third request information, wherein when no response information of the ith cell in the M cells is detected, the third request information indicates the cell identity of the ith cell or the second reference signal information used to recover the ith cell, i is a positive integer, and 1≤i≤M; or when the response information of the jth cell in the M cells is detected, the third request information indicates the confirm information of the jth cell, j is a positive integer, 1≤j≤M, and i≠j.

10. The apparatus according to claim 9, wherein cell information of a $k^{th}$ cell in the M cells comprises q pieces of first reference signal information, k is a positive integer, and 1<q≤N.

11. The apparatus according to claim 10, wherein the processor is configured to:
detect, based on a priority sequence of the q pieces of reference signal information, response information corresponding to the $k^{th}$ cell.

12. The apparatus according to claim 11, wherein the processor is configured to:
detect, in a $p^{th}$ time window based on reference signal information whose priority ranks $p^{th}$ and that is in the q pieces of reference signal information, the response information corresponding to the $k^{th}$ cell, wherein 1≤p≤q.

13. The apparatus according to claim 12, wherein the processor is further configured to: after no response information of the second request information is detected in the $p^{th}$ time window based on the priority ranking $p^{th}$, detect the response information of the second request information in a $(p+1)^{th}$ time window based on reference signal information whose priority ranks $(p+1)^{th}$ and that is in the q pieces of reference signal information, wherein the $(p+1)^{th}$ time window is a time period later than the $p^{th}$ time window.

14. The apparatus according to claim 9, wherein the transceiver is configured to: send the third request information on the second resource.

15. The apparatus according to claim 9, wherein the processor is further configured to deactivate the second resource when the response information of the M cells is detected.

16. The apparatus according to claim 9, wherein when no response information of at least one of the M cells is detected, the transceiver is further configured to resend the first request information on a fourth resource; the transceiver is further configured to receive response information of the resent first request information, wherein the response information of the resent first request information indicates a third resource; and the transceiver is configured to: send the third request information on the third resource.

* * * * *

UNITED STATES PATENT AND TRADEMARK OFFICE
CERTIFICATE OF CORRECTION

PATENT NO. : 11,991,541 B2  
APPLICATION NO. : 17/477973  
DATED : May 21, 2024  
INVENTOR(S) : Di Zhang et al.

Page 1 of 1

It is certified that error appears in the above-identified patent and that said Letters Patent is hereby corrected as shown below:

In the Claims

In Column 62, Line 17, in Claim 1, delete "J:" and insert -- J; --.

Signed and Sealed this  
Thirtieth Day of July, 2024

Katherine Kelly Vidal  
*Director of the United States Patent and Trademark Office*